United States Patent Office 3,526,653
Patented Sept. 1, 1970

3,526,653
PHENYLACETAMIDES
Tsung-Ying Shen, Westfield, Conrad P. Dorn, Plainfield, and William V. Ruyle, Scotch Plains, N.J., assignors to Merck & Co., Inc., Rahway, N.J., a corporation of New Jersey
No Drawing. Application May 13, 1965, Ser. No. 455,360, now Patent No. 3,452,079, dated June 24, 1969, which is a continuation-in-part of application Ser. No. 375,307, June 15, 1964. Divided and this application Mar. 4, 1969, Ser. No. 804,304
Int. Cl. C07c 103/22
U.S. Cl. 260—465                                          2 Claims

ABSTRACT OF THE DISCLOSURE

The invention relates to p-cycloalkyl substituted phenyl acetamides and the processes for the preparation of same. These compounds possess potent anti-inflammatory properties.

---

This application is a divisional of application Ser. No. 455,360 filed on May 13, 1965, which in turn is a continuation-in-part of Ser. No. 375,307, filed June 15, 1964, now abandoned.

This invention relates to new phenyl aliphatic acids, aldehydes, alcohols, and derivatives thereof. More specifically, this invention relates to a p-cycloalkyl or p-lower alkyl-m-substituted phenyl acetic acid and the esters and amides thereof as well as to the corresponding aldehydes, alcohols, acetals, ethers, and non-toxic salts thereof. More specifically also, this invention relates to compounds described by the formula:

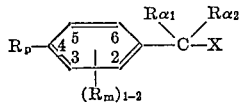

in which:

$R_p$ may be cyclohexyl, cyclopentyl, or lower alkyl;
$R_m$ may be halogen, lower alkoxy, trihalomethyl, lower alkylthio, mercapto, amino, di(lower alkyl)amino, cyano, nitro, carboxamido, lower alkanoylamino lower alkylsulfonyl, di(lower alkyl)sulfamyl, and hydroxy, at least one of said $R_m$ being in the meta position;
$R_{a1}$ is hydrogen;
$R_{a2}$ is lower alkyl, and when taken together, $R_{a1}$ and $R_{a2}$ are methylene or ethylidene; and
X may be COOH; COOR, where R may be lower alkyl, lower alkenyl, lower alkynyl, cyclo lower alkyl, phenyl, lower alkanoylaminophenyl, carboxyphenyl, carboxamidophenyl, lower alkoxy lower alkyl, cyclo lower alkoxy lower alkyl, poly lower alkoxy lower alkyl, poly hydroxy lower alkyl, di(lower alkyl)amino lower alkyl, and cyclo lower alkylamino lower alkyl;

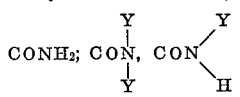

where Y may be lower alkyl, hydroxy lower alkyl, poly hydroxy lower alkyl, phenyl lower alkyl, phenyl, lower alkoxyphenyl, halogenophenyl, trifluoromethylphenyl, cyclohexyl, carbobenzenzyloxymethyl, carboxymethyl, 1-carboxyl-3-carbamyl-propylamino, N - dilower-alkyl-carboxamidomethyl, N-dilower-alkylamino-lower-alkyl, N-lower-alkyl-pyrrolidyl, N - lower - alkyl - pyrrolidyl-lower-alkyl, or Y may form a heterocyclic group with the nitrogen when Y is the group

—CH₂—CH₂—O—CH₂—CH₂—, —CH₂—CH₂—N(R₁)—CH₂—CH₂— in which R₁ is lower alkyl,

—CH₂—CH₂—NH—CH₂—CH₂—, —CH₂—CH₂—N(—CH₂—CH₂—)

—CH₂—CH₂—CH₂—CH₂, —CH₂—CH₂—N(CH₂—CH₂OH)—CH₂—CH₂— and
—CH₂—CH₂—CH₂—CH₂—CH₂—; CH₂OH; CH₂OR₃ where $R_3$ is alkyl; CHO; CH(OR)₂ where $R_2$ is alkyl; the pharmaceutically non-toxic salts may be the ammonium, alkali and alkali earth, amine, magnesium, aluminum iron salts, and the like.

In its more narrow aspects, this invention relates to compounds wherein the 3-position is substituted with an $R_m$ group. In addition, the trihalomethyl group indicated in $R'_m$ may only be placed on the 3-position of the phenyl ring. The above-mentioned aspects of this invention apply equally to compounds wherein X is as previously defined.

In the more preferred aspects of this invention, X is represented by a carboxyl group, $R_p$ by a cyclohexyl group, $R_{a1}$ by hydrogen, and $R_{a2}$ by methyl, or $R_{a1}$ and $R_{a2}$ taken together by methylene. $R_m$ is represented by the groups previously mentioned (especially halogen), and restricted to the 3-position of the phenyl ring.

The development of antiinflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

We have found that the compounds described above are potent antiinflammatory agents. The compounds specifically are substituted phenyl acetic acids or the corresponding salts, esters, alcohols, aldehydes, acetals, or ethers which have certain groups in the p-position and are further substituted by a group in the m-position and substituents on the α-carbon of the side chain.

The compounds of this invention have a high degree of antiinflammatory activity and are effective in the prevention and inhibition of granuloma tissue formation. Certain of them possess this activity in high degree and are of value in the treatment of arthritic and dermatological disorders and in like conditions which are responsive to treatment with antiinflammatory agents. In addition, the compounds of this invention have a useful degree of antipyretic and analgesic activity and also indicate some fatty acid synthesis inhibition. For these purposes, they are normally administered orally in tablets or capsules, the optimum dosage depending, of course, on the particular compound being used and the type and severity of the condition being treated. Although the optimum quantities of these compounds of this invention to be used in such manner will depend on the compound employed and the particular type of disease condition treated, oral dose levels of preferred compounds in the range of 1.0–2,000 mg. per day are useful in control of arthritic conditions, depending on the activity of the specific compound and the reaction sensitivity of the patient.

Since the phenyl acetic acid compounds of the invention possess asymmetric carbon atoms, they are ordinarily present in the form of a racemic mixture. The resolution of such racemates can be carried out by a vast number of known methods. Thus, some racemic mixtures can be precipitated as eutectics instead of mixed crystals and can thus be quickly separated and in such cases can sometimes be selectively precipitated. The more common method of chemical resolution is, however, greatly preferred. By this method diastereomers are formed from the racemic mixture by reaction with an optically-active resolving agent. Thus, an optically-active base can be reacted with the carboxyl group. The difference in solubility between the diastereomers formed permits the selective crystallization of one form and regeneration of the optically-active acid from the mixture. There is, however, a third method of resolving which shows great promise. This is one or the other forms of biochemical procedures using selective enzymatic reaction. Thus, the racemic acid can be subjected to an asymmetric oxidase or decarboxylase which will, by oxidation or decarboxylation, destroy one form, leaving the other form unchanged. Even more attractive is the use of a hydrolysase on a derivative of the racemic mixture to form preferentially one form of the acid. Thus, esters or amides of the acids can be subjected to an esterase which will selectively saponify one enantiomorph and leave the other unchanged.

When the free acid is resolved into (d) and (l) enantiomorphs, the antiinflammatory activity is found to reside virtually completely in the (d) isomer. The desired (d) isomer of the free acid may be prepared by any one of the preceding described resolving methods, preferably working from the free acid as the starting material. For example, amide or salt diastereomers of the free acid may be formed with optically-active amines, such as quinine, brucine, cinchonidine, cinchonine, hydroxyhydrindamine, menthylamine, morphine, α-phenylethylamine, phenyloxynaphthylmethylamine, quinidine, 1-fenchylamine, strychnine, basic amino acids such as lysine, arginine, amino acid esters, and the like. Similarly, ester diastereomers of the free acid may be formed with optically-active alcohols, such as borneol, menthol, 2-octanol and the like. Especially preferred is the use of cinchonidine to give the readily decomposable diastereomer salt which may then be resolved by dissolving in a solvent, such as acetone, and distilling the solvent at atmospheric pressure until crystals begin to appear and further crystallization produced by allowing the mixture to cool to room temperature, thereby separating the two enantiomorphs. The (d) acid may then be recovered from the (d) salt by extracting the salt between an inorganic solvent, such as petroleum ether, and dilute hydrochloric acid.

Derivatives of the resolved (d) form of the free acid then may be prepared in the usual way. These derivatives generally are more active than racemates of the same compounds. Consequently, the (d) form of these compounds, substantially free of the (l) form, is a still further aspect of this invention.

The compounds of this invention are prepared from either an acetophenone (or propiophenone) (hereinafter both called ketone) starting material compound of the formula:

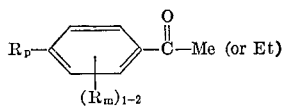

All of the starting materials with the exception of m-trihalomethyl substituent are prepared by nitrating the o,m-unsubstituted ketone and subsequently converting the nitro ketone compounds to the desired $R_m$ substituents. It is to be understood, however, that the conversion of the nitro group may also be accomplished at various stages along the way toward producing the final compound. For example, when a 3-substituted compound is desired, 3-nitro ketone compound (prepared by nitration of the unsubstituted ketone) is converted, when desired, to the corresponding 3-$R_m$ substituents by appropriate reactions. For example, the nitro compound is reduced in the presence of palladium under an atmosphere of hydrogen to form the 3-amino compound. This amino compound may be reacted with an organic halide, such as methyl iodide, to form the mono and disubstituted amino compound or acylated to form a 3-alkanoylamino compound. The amino compound may be diazotized and the diazo replaced by a hydroxyl group, which in turn may be alkylated to form a 3-lower alkoxy compound. The diazonium salt derived from the amino compound may also be treated with ethyl xanthate followed by saponification of the xanthate under alkaline conditions to give the mercapto compound, which may, if desired, then be alkylated with a dialkylsulfate or alkyl halide to the alkylmercapto compound. Also, the diazonium compound may be reacted with a cuprous halide in the cold under acid conditions to form the 3-halide compound or reacted with cuprous cyanide to form a 3-cyano compound, which may then be subjected to alkaline saponification to form a 3-aminocarbonyl compound.

When it is desired to obtain more than one $R_m$ group on the phenyl moiety, another procedure is used. For example, the ketone is nitrated in the 3-position, reduced to the corresponding 3-amino compound and acylated (i.e., acetic anhydride) to the 3-acylamido compound. At this point the 3-acylamido compound is again nitrated (i.e., using fuming nitric and concentrated sulfuric acid) to yield a mixture of the 3-acylamido 5-nitro, 3-acylamido-2-nitro and 3-acylamido-6-nitro ketone compounds. These isomers are then separated by chromatography. Each of these isomers may then be hydrolyzed to give the corresponding 3-amino group, which may be further reacted as previously indicated to yield the desired 3-substituent. Alternatively, the 3-acylamido may remain and the nitro substituent reacted as previously described to yield the desired 2, 5, or 6 substituted compound. Similarly, the 3-acylamido and nitro groups may be reacted in any desired order to obtain the various substituent desired on the 3,5, 2,3 and 3,6 positions of the ketone moiety. Furthermore, the above reaction may be carried out at any other suitable step along the synthesis of the final compounds.

Many of the ketones may be prepared by a variety of other procedures, some of which may be illustrated as follows:

A.

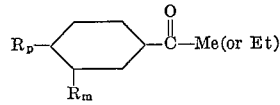

A Friedel-Crafts reaction of benzene with an $R_p$ halide to obtain an $R_p$ benzene compound and an additional Friedel-Crafts reaction using the said $R_p$ benzene compound and a lower alkyl acid chloride to form a p-substituted $R_p$ ketone. The ketone is then placed in concentrated sulfuric acid maintained below room temperature and the resulting solution reacted with fuming nitric acid or the ketone reacted directly with fuming nitric acid to form the 3-nitro-4-$R_p$ ketone. The 3-nitro ketone compound may then be converted to the desired $R_m$ as described on pages 8 and 9 infra.

B.

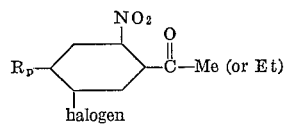

The 3-nitro ketone compound obtained from (A) above is placed in an inert solvent, such as ethanol-dioxane, and reduced with platinum oxide at room temperature under an atmosphere of hydrogen. The solution is then treated with gaseous hydrogen chloride and the amine salt thus obtained is placed in a solution of concentrated hydrochloric acid in water and maintained at below ambient temperature. A solution of sodium nitrite is then added followed by a solution of cuprous chloride and the reaction mixture stirred to obtain a 3-chloro ketone compound. The 3-chloro compound is then nitrated at the 3-position as previously described in (A) to obtain a 3-chloro-6-nitro ketone compound, which, if desired, may be reacted as similarly described on pages 8 and 9 *infra.* to the 2-R$_m$-5-halo keto compounds.

C.

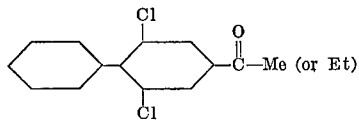

A solution of 4-bromo-2,6-dichloro aniline in benzene and amyl nitrite is refluxed for several hours to obtain 4-bromo-2,6-dichlorobiphenyl. This biphenyl compound is then placed in a glacial acetic acid and reduced at room temperature under an atmosphere of hydrogen with platinum oxide to yield 4-cyclohexyl-3,5-dichlorobromobenzene. This bromobenzene compound is then added to a solution containing magnesium turnings. The solution is then stirred for a while and acetaldehyde (or propionaldehyde) is added and the mixture again refluxed for a short period of time to obtain methyl (or ethyl)-(4-cyclohexyl-3,5-dichlorophenyl)-carbinol. This carbinol compound is then treated with chromium trioxide in dry pyridine to obtain the 4-cyclohexyl-3,5-dichloro ketone compound.

D.

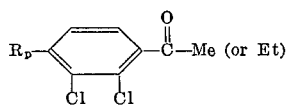

A mixture of 2,3-dichlorobiphenyl and acetic acid is reduced in the presence of platinum oxide under an atmosphere of hydrogen to obtain 2,3-dichlorophenyl-cyclohexane. The phenylcyclohexane compound is then nitrated as in (A) above to obtain 2,3-dichloro-4-nitrophenylcyclohexane. The nitro compound thus obtained is reduced to the corresponding amine in a mixture of platinum oxide and methanol. The amine compound thus obtained is heated in a mixture of concentrated hydrochloric acid and water. The mixture is then cooled and an aqueous solution of sodium nitrite is added. After stirring for a short time at low temperatures, cuprous cyanide is added to this mixture and the mixture is heated for an additional hour to obtain the corresponding cyano compound. The cyano compound is then placed in ether to which a solution of methyl magnesium iodide is added and the mixture stirred. Subsequently, the mixture is poured into a solution of ice and concentrated hydrochloric acid, the ether layer separated, and the ether removed to obtain the 4-cyclohexyl-2,3-dichloro ketone compound.

E.

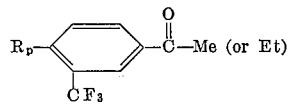

Magnesium turnings are added to a solution of o-bromobenzotrifluoride in ether and the reaction mixture refluxed for an hour. A solution of cyclohexanone (or cyclopentanone or secondarybutyl ketone) in dry ether is added at room temperature at a rate to provide gentle reflux. The mixture is then stirred at room temperature for an additional 16 hours. The mixture is then cooled in an acetone ice bath, hydrochloric acid added, and the ether layer separated. After removal of the ether, the residue is treated with phosphous pentoxide and the mixture heated for an hour. Chloroform is then added to the mixture and the chloroform layer is separated and the chloroform removed to give a residue. The residue is then treated with platinum oxide in methanol and the mixture hydrogenated in an atmosphere of hydrogen to give o-R$_p$-benzotrifluoride. The benzotrifluoride is then nitrated as indicated in (A) above to give a 2-R$_p$-5-nitrobenzotrifluoride. This nitro compound is then converted to the ketone as indicated in (D) above.

The ketone compounds which have been prepared as previously described may be used as the starting material for the preparation of the desired acid compounds, and the acid compounds subsequently appropriately reacted to form the desired aldehydes, acetals, alcohols, ethers, salts, and esters. Flow Sheet I indicates the sequence of steps required for the preparation of all the compounds of this invention and the description which follows indicates the reactions and reaction conditions necessary to prepare these novel compounds.

FLOW SHEET I.—PROCESS OF THIS INVENTION

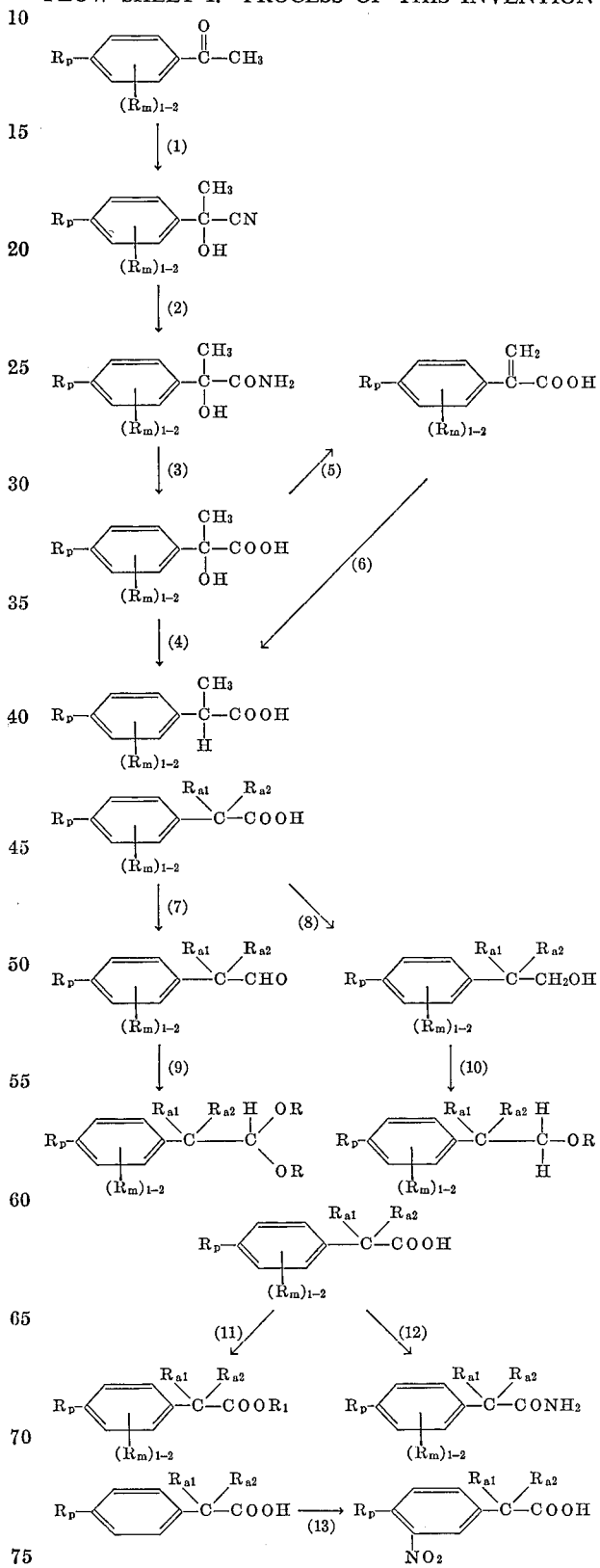

Equivalents

As those previously mentioned, including the appropriate restrictions.

Reactions and conditions

*Step (1).*—Reaction with a cyano compound, such as sodium cyanide, potassium cyanide, hydrogen cyanide, lower ketone cyanohydrin, and the like [preferably hydrogen cyanide with an amine such as a primary, secondary, or tertiary aliphatic amine (ethylamine, propylamine, diethylamine, and trimethylamine)] in a solvent such as lower alkanols (methanol, ethanol, propanol, and the like), liquid hydrogen cyanide, ether, dioxane, tetrahydrofuran, water, mixtures of water and the above organic solvents, lower alkanoic acids (acetic, propionic, and the like), and mixtures of the acids and above solvents, preferably, however, using liquid hydrogen cyanide as the reactant as well as the solvent, at any suitable temperature, preferably 45–100° C., but especially 75–85° C., until the reaction is substantially complete.

*Step (2).*—Reaction by methods well known in the art, such as reaction under acid conditions. Preferably, reaction with a mineral acid (hydrogen chloride, hydrogen bromide, sulfuric acid, phosphoric acid, and the like, preferably fortified hydrochloric acid) in an inert solvent, such as lower alkanols (methanol, ethanol, propanol), ether, dioxane, tetrahydrofuran, and the like, preferably employing the acid as the solvent also, between temperatures of 0° and 50° C., preferably at or below ambient temperatures, until the reaction is substantially complete.

*Step (3).*—Acid or basic reaction by methods well known to the art. Preferably, reaction with aqueous alkali or alkali earth hydroxides, such as sodium, potassium, barium, lithium, and strontium hydroxides, or non-aqueous alkali and alkali earth hydroxides with lower alkanols (methanol, propanol, and the like), ethylene glycol, and the like, aqueous ammonium hydroxide, organic amines (such as lower aliphatic amines), and the like, preferably aqueous sodium or potassium hydroxide, but especially concentrated aqueous sodium hydroxide (6–12 N) using the above aqueous hydroxides as the solvents or lower alkanols as the solvents, preferably using the aqueous hydroxide reactants as solvents also, at any desirable temperature (0° C. to reflux), preferably at or near reflux, until the reaction is substantially complete.

*Step (4).*—Reduction by means well known to the art, i.e., hydrogenation with palladium under acid conditions with phosphorous and iodine and the like. Preferably however, reaction with an acid such as lower aliphatic acids (acetic acid, propionic acid, and the like), aromatic acids, inorganic acids, such as phosphoric acid, hydrochloric acid, and the like, and with phosphorus and iodine or hydrogen iodine, preferably phosphorus and iodine, using the above acids as solvents also or in ether, dioxane, tetrahydrofuran, and the like, preferably the above acids as solvents at any suitable temperature (room temperature to 150° C., preferably 100–120° C.) until the reaction is substantially complete.

*Step (5).*—Acid catalyzed dehydration, or formation of the ester of the α-OH with an organic or inorganic acid, followed by pyrolysis, or basic treatment by methods well known to the art. Preferably, the reaction is carried out in an acid medium using strong acids such as toluenesulfonic acid, p-nitrobenzenesulfonic acid, benzenesulfonic acid, trichloroacetic acid, a mixture of acetic acid and sulfuric acid, and the like (preferably toluenesulfonic acid) in an inert solvent such as aromatic compounds (benzene, toluene, xylene, and the like), dioxane, tetrahydrofuran, lower alkanoic acids (acetic acid, propionic acid, and the like), preferably acetic acid or tetrahydrofuran at elevated temperatures (75–150° C., preferably at or near the reflux temperature of the system) until the reaction is substantially complete.

*Step (6).*—Reduction of an α-alkylidene to the corresponding α-lower alkyl, by methods well known to the art. Preferably, reduction over a catalyst such as palladium, platinum, or Raney nickel, especially 5–10% palladium oxide under moderate hydrogen pressure (5–60 pounds, preferably 40 pounds) in an inert solvent such as lower alkanols (methanol, ethanol, butanol, and the like), aromatic compounds (benzene, toluene, xylene, and the like), tetrahydrofuran, dioxane, acetic acid, and the like at any suitable temperature (0° C. to the reflux temperature of the system, preferably at room temperature) in ethanol until the reaction is substantially complete.

*Step (7).*—Reduction of an acid to its corresponding aldehyde, by methods well known to the art. Preferably, reaction with a compound such as thionyl chloride, thionyl bromide, phosphorus pentachloride, phosphorus pentabromide, phosphorus oxychloride, oxybromide, and the like, preferably thionyl chloride, in an inert solvent such as benzene, toluene, xylene, ethers (diethyl ether, dioxane), tetrahydrofuran, and the like, preferably benzene or toluene at any suitable temperature (room temperature to reflux, preferably at or near the reflux temperature of the system) until the formation of the acid halide is substantially complete; preferably subsequent removal of the hydrohalic acid and sulfur dioxide thus formed and reaction of the acid halide with a Rosenmund catalyst such as 5% palladium on BaSO$_4$ with quinoline or with a tritertiarybutoxy alkali or alkali earth aluminum hydride such as potassium, sodium, and lithium aluminum hydride and the like, preferably reduction with tritertiarybutoxy alkali and alkali earth aluminum hydrides, but especially tritertiarybutoxy lithium aluminum hydride in an inert solvent such as benzene, toluene, xylene, ethers (diethyl ether, dioxane, and the like) and tetrahydrofuran, preferably tetrahydrofuran or ether at any suitable temperature (−80° C. to room temperature), preferably −35° C. to −15° C., until the reaction is substantially complete.

*Step (8).*—Reduction by methods well known to the art. For example, reduction with an alkali or alkali earth aluminum hydride, such as lithium, potassium, sodium, and the like. Preferably 200–400% excess lithium aluminum hydride in an inert solvent such as tetrahydrofuran, diethyl ether, and the like, preferably ether, at any suitable temperature (−16° C. to reflux, preferably 0° C. to ambient temperatures) until the formation of the alcohol salt is substantially complete followed by addition of a material to consume the excess hydride such as water, lower alkanols, dilute mineral acids (hydrochloric acid, hydrobromic acid, sulfuric acid, and the like), preferably addition of water followed by a dilute mineral acid (hydrochloric acid, hydrobromic acid, sulfuric acid, and the like), especially water and dilute sulfuric acid, at any suitable temperature, ambient temperatures preferred, until the reaction is substantially complete.

*Step (9).*—Reaction with a lower alkanol under an acid catalyst, by methods well known to the art. For example, reaction with a strong acid such as toluenesulfonic acid, p-nitrobenzenesulfonic acid, benzenesulfonic acid, trichloroacetic acid, mineral acids (hydrochloric acid, hydrobromic acid, sulfuric acid, and the like), boron trifluoride and the like. Preferably reaction with a catalytic amount of toluenesulfonic acid or concentrated hydrochloric acid and with a lower alkanol (methanol, ethanol, propanol, butanol, and the like, preferably methanol) using the alcohols as solvents or combinations of the alcohols and ethers or aromatic compounds at any suitable temperature (0° C. to reflux, preferably ambient temperatures) until the reaction is substantially complete.

*Step (10).*—Etherification by methods well known to the art. For example, etherification by using an alcohol, alkyl halide, alkyl sulfate and the like. Preferably, reaction with a lower alkyl halide and a strongly basic condensing agent such as sodium hydride, potassium hydride, potassium hydroxide, potassium tertiary butoxide, sodamide, and the like (preferably sodium hydride) and a lower alkyl halide such as methyl iodide, propyl iodide, methyl bromide, ethyl bromide, and the like (preferably 50% excess of methyl iodide) in any non-active hydrogen solvent such as aromatic solvents (benzene, toluene, xylene, and the like), ethers diethyl ether, dioxane, tetrahydrofuran, and the like), dimethylformamide and the like, preferably dimethylformamide, at any suitable temperature (0–50° C., preferably ambient temperatures) until the reaction is substantially complete.

*Step (11).*—Esterification by any method well known to the art. Preferably, reaction with a strong acid such as hydrochloric acid, sulfuric acid, toluenesulfonic acid, p-nitrotoluenesulfonic acid, benzenesulfonic acid and the like (preferably 1–3% concentrated sulfuric acid) and with an appropriate alcohol (lower alkanols, ar-lower alkanols and the like; especially a lower alkanol such as methanol or ethanol) using the alcohol as solvent also or using an inert solvent such as tetrahydrofuran, ether, and dioxane at any suitable temperature and time.

*Step (12).*—Amidation reaction by any method well known to the art. Preferably, reaction with thionyl chloride, thionyl bromide, phosphorus oxychloride, phosphorus oxybromide, phosphorus pentachloride, or phosphorus pentabromide in an inert solvent such as ether, benzene, toluene, xylene, tetrahydrofuran, dioxane, and the like to form the acid halide, followed by reaction with an excess of the amine at any suitable temperature (0° C. to room temperature preferred); or reaction with dicyclohexylcarbodiimide and an excess of the amine at any suitable temperature until the reaction is substantially complete. The amine, may be ammonia, a lower alkyl amine, an ar-lower alkyl amine and the like. Preferably however, ammonia or a lower alkyl amine.

*Step (13).*—Preparation of the acid halide as indicated in Step (12) and reaction of the halide with a lower alkanol to form an ester followed by reaction of the ester thus obtained with concentrated sulfuric acid and fuming nitric acid, then saponification of the nitro ester to the free acid.

In Step (1) when it is desired to employ tthe cyanide salt, it is necessary to have the reaction mixture at a pH below 7. This is necessary in order to have the cyanide salt react as the acid. When the preferred procedure is used, namely, using hydrogen cyanide the use of an amine, preferably a tertiary amine, is highly preferred, although not absolutely necessary.

In Step (2), an acid condition is necessary to obtain this reaction, and those acids as previously indicated may be used. The reaction may be run above a temperature of 50° C. However, when higher temperatures are used, a mixture of the desired compound as well as the alkylenyl acid is obtained, and it is possible that the reaction may be run at temperatures wherein only the alkylenyl acid compound is obtained.

In Step (5), the reaction may be properly carried out only under acid conditions. A dilute to concentrated acid reaction mixture may be employed. However, it is preferred to use a concentrated reaction mixture, preferably an aliphatic acid such as acetic acid.

In Step (7), it is preferred to remove the inorganic acid formed after the acid halide preparation; otherwise, the inorganic acid would preferentially consume the subsequent addition of the hydride. However, if it is desired, the inorganic acid may remain if an excess of the hydride is used to react with the inorganic acid as well as the acid halide. The preferred hydride in this step is the tritertiary butoxy lithium aluminum hydride. When this reagent is used, it is preferred to use temperatures below 0° C. If temperatures above 0° C. are used, the reduction will preferentially lead to the corresponding alcohol instead of the aldehyde. As indicated, although higher temperatures may be used, it is not economically feasible, for a reaction temperature will be reached wherein the corresponding alcohol will be almost exclusively produced. However, if the alcohol is desired, this is still another way of going directly from the acid to the alcohol.

In Step (8), in the preferred reaction almost any solvent could be used, as long as it is inert to the hydride (non-active hydrogen solvent) and the respective reactants have some degree of solubility in the solvent. The acid is used in this step to convert the salt of the alcohol to the free alcohol. The excess hydride is conveniently removed for isolation purposes by either treating the reaction mixture with an active hydrogen compound, such as water, or by converting the salt to the alcohol and consumption of the hydride in one step by the cautious addition of an excess of dilute acid.

In Step (9), the quantity of acid employed is not critical as long as the acid used is a strong acid so as to catalyze the reaction. This reaction may also be carried out by employing the aldehyde and the appropriate lower alkyl orthoformate. When it is desired to isolate the acetal formed in this step and water is to be used in the isolation procedure, the reaction mixture must be neutralized with a compound such as sodium carbonate so as to prevent the hydrolysis of the acetal back to the aldehyde.

In Step (10), in the preferred reaction the yield will be affected by the amount of halide used; therefore, it is preferred to use an excess of the halide. In addition, the reaction mixture should not contain compounds with active hydrogens. Therefore, if an active hydrogen solvent from the previous step is present, such as alcohols, it must either be removed prior to the hydride addition or sufficient hydride used to first react with the active hydrogen compound and then be used for the desired reaction. However, it is preferred to first remove any active hydrogen solvent before proceeding with this step.

In Step (11), the acid may be esterified by any known means. In this reaction step, the alcohol used for esterification is normally used as the solvent also. However, when the alcohol is not suitable for use as a solvent, inert solvents are to be used along with the alcohol, as previously indicated. When using phenol as the alcohol for the esterification step, it is highly preferred to azeotrope the water formed so as to allow ester formation. Another highly suitable procedure for this esterification step is the reaction of the acid with at least one mole of a diimide (such as dicyclohexylcarbodiimide) and the appropriate alcohol in an inert solvent such as tetrahydrofuran.

In Step (12) where possible, it is preferred to use the amine itself as the solvent. When this cannot be conveniently done, an inert solvent is used wherein the respective components are fairly soluble. In addition, it is preferred to remove the excess reagent and acidic by-products formed in this reaction prior to the addition of amine. However, the acid may be neutralized by using an excess of the desired amine. Step (12) may also be carried out as follows: A mixture of dicyclohexylcarbodiimide, an excess of the amine, and the acid itself are reacted to produce the amide. The three components are mixed at −10 to 50° C. (ambient temperature preferred) for several hours to obtain the desired amide.

In Step (13), the reaction may be carried out using concentrated sulfuric acid as the solvent and employing an excess of fuming nitric acid and allowing the reaction to continue at temperatures below room temperature, preferably −5° to 5° C., until the reaction is substantially complete. As indicated previously, the nitro ester compound is formed in this step. However, the ester may be converted to any of the other desired side chains (such as acid, alcohol, ether, and the like) by the reactions previously mentioned.

In Steps (7) and (9), compounds containing the hydroxy, primary amino, or secondary amino group are preferably protected in some way. When it is desired to use either the hydroxy or amino groups, the compound may be benzylated before reaction Step (7). When Step (7) is carried out, the reduction will not only reduce the acid to the aldehyde, but at the same time will debenzylate the above-mentioned groups to yield the appropriate hydroxy or amino group.

The following examples are given by way of illustration:

EXAMPLE 1

4-cyclohexyl-3-nitroacetophenone

To 50 cc. of concentrated sulfuric acid at −10° C. is added portionwise 10.0 grams of 4-cyclohexylacetophenone. The green-yellow solution is stirred and 10.0 cc. of fuming nitric acid (Sp.G. 1.5) is added dropwise. The temperature of the reaction mixture is maintained at −10° C. throughout the addition and for 1 hour afterwards. The reaction mixture is then poured onto ice and the oil which separates is extracted with (2× 50 ml.) chloroform. The chloroform solution is then washed with water, dried over sodium sulfate, and concentrated to an orange-yellow oil. Crystallization from ethanol yields 10.5 grams of 4-cyclohexyl - 3 - nitroacetophenone. M.P. 66–67° C.

When 4 - cyclohexylpropiophenone, 4 - cyclopentylacetophenone, and 4 - secondarybutylacetophenone are used in the above example in place of 4-cyclohexylacetophenone, there are obtained 4-cyclohexyl-3-nitropropiophenone (M.P. 59–60° C.), 4-cyclopentyl-3-nitroacetophenone, and 3 - nitro - 4 - secondarybutylacetophenone respectively.

EXAMPLE 2

3-chloro-4-cyclohexylacetophenone

A solution of 9.89 grams (0.04 mole) of 4-cyclohexyl-3-nitroacetophenone in 250 cc. ethanol containing 10 cc. concentrated hydrochloric acid is reacted with hydrogen in the presence of 0.2 gram of platinum oxide. After the theoretical amount of hydrogen is taken up, the reaction mixture is filtered and concentrated to an oily solid. This solid is then dissolved in 100 cc. concentrated hydrochloric acid and 50 cc. of water and cooled to 0° C. To this cooled solution is added with stirring a solution of 3.0 grams of sodium nitrite (0.04 mole) in 10 cc. of water. After a period of 10 minutes, there is added a solution of 20.0 grams cuprous chloride in 100 cc. concentrated hydrochloric acid and 100 cc. of water. The reaction mixture is stirred overnight and allowed to warm to room temperature. The mixture is then poured onto ice and extracted well with (3× 50 ml.) ether. The ether extracts are then washed with water, dried over sodium sulfate, and concentrated. The resulting oil is chromatographed on 200 grams of silica gel using benzene-petroleum ether 1:1 as eluent to yield 3.6 grams of 3-chloro-4-cyclohexylacetophenone as an oil. The ketone is characterized by means of its 2,4 - dinitrophenylhydrazone. M.P. 206.5–207.5° C.

When hydrobromic acid and cuprous bromide are used in place of hydrochloric acid and cuprous chloride in the above example, there is obtained 3-bromo-4-cyclohexylacetophenone.

When 4- - cyclohexyl - 3 - nitropropiophenone, 4-cyclopentyl - 3 - nitroacetophenone, and 3 - nitro-4-secondarybutylacetophenone are used in the above example in place of 4-cyclohexyl-3-nitroacetophenone, there are obtained 3-chloro-4-cyclohexylpropiophenone (B.P. 165° C. at 0.65 mm.). 3-chloro-4-cyclopentylacetophenone, and 3-chloro-4-secondarybutylacetophenone respectively.

EXAMPLE 3

3-amino-4-cyclohexylacetophenone

To a solution of 24 grams of 4-cyclohexyl-3-nitroacetophenone in 250 ml. of absolute ethanol is added ½ gram of platinum oxide. The mixture is then hydrogenated at room temperature for 1 hour. The product is then dissolved as much as possible by heating on a steam bath and filtered. The moist cake is dissolved in 500 ml. of hot ethanol and the catalyst is removed by filtration. After removal of the solvent in vacuo, the product thus obtained is dissolved in ether, extracted with 2 N hydrochloric acid, and received by neutralization and extraction of the aqueous layer with ether. Additional product may be obtained from the original ether layer, since the hydrochloride salt is ether soluble. The ether extract is dried over sodium sulfate, filtered, and the solvent removed. Recrystallization of the residue from 250 ml. of boiling hexane yields 3-amino-4-cyclohexylacetophenone.

When 4 - cyclohexyl-3-nitropropiophenone is used in place of 4-cyclohexyl-3-nitroacetophenone in the above example, there is obtained 3-amino-4-cyclohexylpropiophenone, M.P. 88–89° C.

EXAMPLE 3A

3-acetamido-4-cyclohexylacetophenone

A mixture of 25 ml. of acetic anhydride and 0.01 mole of 3-amino-4-cyclohexylacetophenone is heated on the steam bath for 3 hours. The reaction mixture is poured onto ice-water and after it is stirred for 1 hour, the mixture is filtered to give 3-acetamido-4-cyclohexylacetophenone.

EXAMPLE 3B (1) 3-acetamido-4-cyclohexyl-5-nitroacetophenone
(2) 3-acetamido-4-cyclohexyl-2-nitroacetophenone
(3) 3-acetamido-4-cyclohexyl-6-nitroacetophenone To 200 ml. of a solution of 5 parts fuming nitric acid and 2 parts of concentrated sulfuric acid which has been cooled to −10 to −15° C. is added with stirring over a period of 1 hour 0.1 mole of 3-acetamido-4-cycolhexylacetophenone. The reaction mixture is stirred at −10 to −15° C. for one hour after the addition is completed. The mixture is then poured onto crushed ice and made alkaline with ammonia. The nitro compounds are then filtered off and dried. Chromatography on 2000 gm. of silica gel and elution with ether-petroleum ether (0–100%) gives:

3-acetamido-4-cyclohexyl-5-nitroacetophenone,
3-acetamido-4-cyclohexyl-2-nitroacetophenone, and
3-acetamido-4-cyclohexyl-6-nitroacetophenone.

EXAMPLE 3C

3-amino-4-cyclohexyl-5-nitroacetophenone

To a refluxing solution of 0.01 mole of 3-acetamido-4-cyclohexyl-5-nitroacetophenone in 100 ml. of 95% ethanol is added 50 cc. of concentrated hydrochloric acid. The mixture is refluxed for 5 hours after which time 200 cc. of water are added and the reaction mixture made alkaline with dilute sodium hydroxide. The reaction mixture is then extracted well with (3× 200 ml.) ether. The combined ether extracts are washed with (3× 50 ml.) water, dried over sodium sulfate and the solvent then removed to give 3-amino-4-cyclohexyl-5-nitroacetophenone.

When 3 - acetamido - 4 - cyclohexyl - 2 - nitroacetophenone and 3 - acetamido - 4 - cyclohexyl - 6 - nitroacetophenone are used in place of 3 - acetamido-4-cyclohexyl-5-nitroacetophenone in the above example, there is obtained 3 - amino - 4 - cyclohexyl - 2 - nitroacetophenone and 3 - amino - 4 - cyclohexyl - 6 - nitroacetophenone, respectively.

EXAMPLE 3D

The procedure of Example 3 is employed using 3 - acetamido - 4 - cyclohexyl - 5 - nitroacetophenone, 3 - acetamido - 4 - cyclohexyl - 2 - nitroacetophenone and 3 - acetamido - 4 - cyclohexyl - 6 - nitroacetophenone obtained from Example 3B in place of 4 - cyclohexyl-3-nitroacetophenone to obtain the corresponding 3-acetamido - 5 - amino - 4 - cyclohexylacetophenone, 3-acetamido - 2 - amino - 4 - cyclohexylacetophenone and 3 - acetamido - 6 - amino - 4 - cyclohexylacetophenone, respectively.

EXAMPLE 4

3-chloro-4-cyclohexylacetophenone

A suspension of 10 grams of 3-amino-4-cyclohexyl-acetophenone and 18 ml. of concentrated hydrochloric acid in 16 ml. of water is heated until the solid dissolves. The solution is then cooled to 0° C. (whereupon the hydrochloride precipitates) and 3.24 grams of sodium nitrite and 6 ml. of water is added to the chilled, stirred solution. After the suspension has remained in the ice bath for 15 minutes, 13.2 grams of cuprous chloride dissolved in 240 ml. of concentrated hydrocholric acid is added dropwise with vigorous stirring to the chilled mixture. The mixture is then stirred overnight at room temperature. At this point, the reaction mixture is poured into 500 grams of ice, the product extracted with (5× 200 ml.) ether, and the combined ether extracts washed successively with water until neutral, 500 ml. of 1 N sodium hydroxide, again with water until neutral, dried over magnesium sulfate, filtered, and concentrated in vacuo. The residue thus obtained is then treated with petroleum ether to yield 3 - chloro - 4 - cyclohexylaceto-phenone.

When 3 - amino - 4 - cyclohexylpropiophenone is used in place of 3 - amino - 4 - cyclohexylacetophenone in the above example, there is obtained 3 - chloro - 4 - cyclohexylpropiophenone. B.P. 165° C. at 0.65 mm.

Similarly, when the 3-acetamido-5-, 2- and 6-amino compounds obtained from Example 3D are used in place of 3-amino-4-cyclohexylacetophenone in the above example, there are obtained the corresponding 3-acetamido-5-, 2- and 6-chloro compounds, respectively.

EXAMPLE 5

4-cyclohexyl-3-mercaptopropiophenone

To 20.3 grams of 3-amino-4-cyclohexylpropiophenone in 17.6 cc. of concentrated hydrochloric acid and 30 grams of ice is added 6.5 grams sodium nitrite in a small volume of water. The heterogeneous mush that results is then added portionwise with stirring during ½ hour to 16.4 grams of potassium ethyl xanthate in 21 cc. water heated at 40–45° C. After stirring an additional hour during which time a gum precipitates, the mixture is cooled and extracted with ether. The ether extract is washed with water, dilute sodium hydroxide, and water to neutrality. The extract is then dried and evaporated in vacuo. The residue is triturated with ether and the insoluble m-hydroxy by-product is removed. The ether is evaporated in vacuo to give 19.1 grams of the crude m-xanthate. The crude m-xanthate is then dissolved in 54 cc. ethanol and while refluxing the solution, 20.5 grams potassium hydroxide pellets are added portionwise. After complete addition, the reaction mixture is refluxed until a few drops in water gives an almost clear solution. The mixture is then concentrated to dryness in vacuo. The residue is dissolved in water and extracted three times with ether to remove the alkali insoluble material. The alkaline layer is charcoaled, acidified with 6 N sulfuric acid and the precipitated oil extracted with ether. The ether solution is then dried and evaporated in vacuo to give 6.1 grams of 4-cyclohexyl-3-mercaptopropio-phenone.

When the 3-acetamido-5-, 2- and 6-amino compounds obtained from Example 3D are used in place of 3-amino-4-cyclohexylacetophenone in the above example, there are obtained the corresponding 3-acetamido-5-, 2- and 6-mercapto compounds, respectively.

EXAMPLE 6

4-cyclohexyl-3-methylmercaptopropiophenone

The m-mercapto intermediate obtained from Example 5 is mixed with 60 cc. water containing 1.0 gram of sodium hydroxide. To this suspension is added dropwise 3.1 cc. of dimethyl sulfate while stirring. The reaction mixture gets warm and after stirring fifteen minutes, an oil forms. After stirring an additional two hours, the mixture is extracted with ether, which is washed with water, dried, and evaporated in vacuo. The 5.6 grams of residue are dissolved in benzene and added to 168 grams of silica gel prepared with benzene. The column is eluted with benzene to yield 4-cyclohexyl-3-methylmercapto-propiophenone.

When the mercapto intermediates of the 3-acetamido compounds obtained from Example 5 are used in place of the mercapto intermediate in the above example, there are obtained the corresponding 3-acetamido-5-, 2- and 6-methylmercapto compounds, respectively.

EXAMPLE 7

4-cyclohexyl-3-methylsulfonylacetophenone

A mixture of 0.01 mole of 4-cyclohexyl-3-methylthio-acetophenone, excess potassium permanganate, and 50 ml. of 2.5 N sodium hydroxide is stirred at room temperature for 2 hours. To the mixture is then added sufficient ethanol to consume the excess potassium permanganate. The reaction mixture is then filtered and the filtrate treated with an excess of dilute aqueous hydrochloric acid. The mixture is then filtered and the cake washed with (2× 15 ml.) water to obtain a solid 4-cyclohexyl-3-methylsulfonyl-acetophenone.

When the 3-acetamido-5-, 2- and 6-methylthio compounds obtained from Example 6 are used in place of 4-cyclohexyl-3-methylthioacetophenone in the above example, there are obtained the corresponding 3-acetamido-5-, 2- and 6-methylsulfonyl compounds, respectively.

EXAMPLE 8

α-methyl-4-cyclohexyl-1-3-(N,N-dimethylsulfonamido)-phenyl acetic acid

A solution of 0.1 mole of methyl α-methyl-4-cyclo-hexyl-3-mercaptophenyl acetate in 100 ml. of 1 N sodium hydroxide solution is treated with a slight excess of potassium permanganate. When the oxidation is complete, the manganese dioxide is removed by filtration, the filtrate is concentrated to a small volume, and the methyl α-methyl-4-cyclohexyl-3-sulfonylphenyl acetate is isolated by acidification with hydrochloric acid. The sulfonyl compound is thoroughly dried and heated at reflux with excess thionyl chloride. The excess thionyl chloride is removed by distillation, leaving a residue of methyl α-methyl-4-cyclohexyl-3-chlorosulfonylphenyl acetate. To this residue is added a solution of 100 ml. of benzene with excess dimethylamine and the mixture stirred for 1 hour. The mixture is washed with water, dried over sodium sulfate, and evaporated to yield methyl α-methyl - 4-cyclohexyl-3-(N,N-dimethylsul-fonamido)-phenyl acetate. A solution of the methyl ester in 90% aqueous ethanol containing 2 equivalents of sodium hydroxide is allowed to stand at room temperature for 18 hours. The mixture is concentrated in vacuo and acidified with dilute hydrochloric acid to yield α-methyl-4-cyclohexyl - 3 - (N,N-dimethylsulfonamido)-phenyl acetic acid.

When the esters of the 3-acetamido-5-, 2- and 6-mercapto compounds obtained from Example 47 are used in place of methyl-α-methyl-4-cyclohexyl-3-mercaptophenyl acetate in the above example, there are obtained the corresponding 3-acetamido-5-, 2- and 6-(N,N-dimethylsul-fonamido) acetic acid compounds, respectively.

EXAMPLE 9

5-chloro-4-cyclohexyl-2-nitroacetophenone

To 100 cc. of concentrated sulfuric acid maintained at −10° to −15° C. is added while stirring 6.0 grams of 3-chloro-4 - cyclohexylacetophenone. There is then added dropwise 15 cc. of fuming nitric acid (Sp.G. 1.5), the temperature being maintained at −15° to −10° C. during the addition and for 1 hour afterward. The reaction mixture is then poured onto ice and extracted well with ether. The combined ether extracts are washed well with water, dried over sodium sulfate, and concentrated to give an oily solid. The residue is then chromatographed on 500 grams of silica gel. Elution with 10% ether-petroleum ether yields 4.1 grams of 5-chloro-4-cyclohexyl-2-nitroacetophenone (M.P. 143–144° C.).

When 3-bromo-4-cyclohexylacetophenone is used in place of 3-chloro-4-cyclohexylacetophenone in the above example, there is obtained 5-bromo-4-cyclohexyl-2-nitroacetophenone.

EXAMPLE 10

4-cyclohexyl-2,5-dichloroacetophenone

To a solution of 2.81 grams of 5-chloro-4-cyclohexyl-2-nitroacetophenone and 50 ml. of ethanol-25 ml. dioxane is added 0.1 gram of platinum oxide and the mixture hydrogenated at room temperature. The reaction mixture is filtered and the filtrate concentrated to an oil. The oil is dissolved in ether and the resulting solution is cooled and saturated with gaseous hydrogen chloride. The amine salt (2.37 grams) is collected, dried, and then suspended in a well-stirred mixture of 50 cc. concentrated hydrochloric acid and 25 cc. of water which has been cooled to 0° to −5° C. A solution of 0.7 gram sodium nitrite in 15 cc. of water is added dropwise, and after 15 minutes has elapsed, a solution of 5 grams cuprous chloride in 50 cc. of hydrochloric acid-water (1:1) is added. The reaction mixture is then stirred overnight at room temperature, poured onto ice, and extracted well with (2× 50 ml.) ether. The combined ether extracts are washed well with (2× 25 ml.) water, dried over sodium sulfate, and concentrated. The resulting oil is chromatographed on 100 grams of acid-washed alumina. Elution with 2% ether-petroleum ether gives 2.11 grams of colorless 4 - cyclohexyl-2,5-dichloroacetophenone (M.P. 136–137° C.).

When 5-bromo-4-cyclohexyl-2 - nitroacetophenone is used in place of 5 - chloro - 4-cyclohexyl-2-nitroacetophenone in the above example, there is obtained 5-bromo-2-chloro-4-cyclohexylacetophenone.

When hydrogen bromide, hydrobromic acid, and cuprous bromide are used in place of hydrogen chloride, hydrochloric acid, and cuprous chloride in the above example, there is obtained 2-bromo-5-chloro-4-cyclohexylacetophenone.

EXAMPLE 11

2,3-dichlorophenylcyclohexane 400 ml. of acetic acid containing 11.0 grams platinum oxide is treated with hydrogen under 41 lbs. of pressure. When no more hydrogen is taken up, 22.31 grams (0.1 mole) of 2,3-dichlorobiphenyl is added, and this mixture is reduced until 0.3 mole of hydrogen has been taken up. The reaction mixture is then filtered and the filtrate concentrated in vacuo. The residue is then fractionally distilled to yield 11.82 grams of 2,3-dichlorophenylcyclohexane. B.P. 124–126° C. at 1.4–1.5 mm.

EXAMPLE 12

2,3-dichloro-4-nitrophenylcyclohexane

To 150 cc. concentrated sulfuric acid at 0° to −5° C. is added while stirring 10.0 grams of 2,3-dichlorophenylcyclohexane. There is then added dropwise with stirring 10.0 cc. of fuming nitric acid, the temperature of the reaction mixture being kept at 0° to −5° C. throughout the addition. The mixture in then stirred at 0° C. for 1 hour, poured onto ice, and extracted well with (2× 50 ml.) ether. The combined ether extracts are washed with (2× 25 ml.) water, dried over sodium sulfate, and concentrated. The residue is chromatographed on 300 grams of silica gel. Elution with ether-petroleum ether (10–70%) gives 2,3-dichloro-4-nitrophenylcyclohexane.

EXAMPLE 13

1-(o-trifluoromethylphenyl)-cyclohexanol

A solution of 113 grams (0.5 mole) of o-bromobenzotrifluoride in 150 ml. dry ether is added dropwise to 12.2 grams (0.5 mole) of magnesium turnings in 100 ml. dry ether with stirring. After a few ml. of solution is added, the mixture is heated in a hot-water bath until the reaction has started. After complete addition, the reaction mixture is refluxed for 1 hour. A solution of 48.8 grams (0.5 mole) of cyclohexanone in 50 ml. dry ether is then added at room temperature at a rate to provide a gentle reflux. After complete addition, the reaction mixture is allowed to stir at room temperature overnight. The reaction mixture is then cooled in an acetone-ice bath and 104 ml. of 5 N hydrochloric acid is added dropwise with stirring. The mixture is stirred an additional ½ hour and the ether layer is separated. The acid layer is then extracted with fresh ether. The ether extracts are combined, washed with water, dried over anhydrous magnesium sulfate, and evaporated in vacuo to yield 1-(o-trifluoromethylphenyl)-cyclohexanol.

EXAMPLE 14 o-(1-cyclohexenyl)-benzotrifluoride

To the 1-(o-trifluoromethylphenyl)-cyclohexanol obtained in Example 13 from 113 grams of o-bromobenzotrifluoride is added 34 grams of phosphorus pentoxide and the mixture heated on a steam bath. After the initial reaction has occurred and subsided, an equal amount of phosphorous pentoxide is added and the mixture is heated on the steam bath for 1 hour. The mixture is then distributed between chloroform and water. The chloroform layer is separated, washed with water, dried over anhydrous magnesium sulfate, and evaporated in vacuo. The liquid residue is distilled in vacuo at 8–9 mm., yielding 64.6 grams of the o-(1-cyclohexenyl)-benzotrifluoride. B.P. 100–104° C.

EXAMPLE 15 o-(1-cyclohexyl)-benzotrifluoride

To 64.0 grams of o-(1-cyclohexenyl)-benzotrifluoride is added 200 ml. of methanol and 1.0 gram of platinum oxide. The mixture is then hydrogenated at room temperature and 40 p.s.i. After completion of the reaction, the mixture is filtered and the filtrate evaporated in vacuo. The residual oil thus obtained is distilled at 5–6 mm., yielding 60.8 grams of o-(1-cyclohexyl)-benzotrifluoride. B.P. 92–93° C.

Calc'd for $C_{13}H_{15}F_3$ (percent): C, 68.40; H, 6.62. Found (percent): C, 68.39; H, 6.92.

EXAMPLE 16

2-cyclohexyl-5-nitrobenzotrifluoride

Ten grams (0.044 mole) of o-(1-cyclohexyl)-benzotrifluoride is added dropwise with stirring to 90 grams of water-cooled fuming nitric acid. The inner temperature of the reaction mixture is maintained at about 16° C. After complete addition, the milky heterogeneous mixture is slowly heated. The mixture becomes homogeneous at about 40° C. and slight boiling occurs at 55–60° C. After heating at a maximum temperature of 65° C. for ½ hour, the heat is removed and stirring is continued for several hours. The mixture becomes cloudy again on removal of the heat. The reaction mixture is then poured into an ice-water mixture and the mixture is filtered. The cake thus obtained is washed with excess water and air dried. The solid is then recrystallized from methanol yielding a total of 8.4 grams of 2-cyclohexyl-5-nitrobenzotrifluoride. M.P. 68–69° C.

Calc'd for $C_{13}H_{14}F_3NO_2$ (percent): C, 57.14; H, 5.16. Found (percent): C, 57.24; H, 5.09.

EXAMPLE 17

5-amino-2-cyclohexylbenzotrifluoride

To a solution of 26.6 grams (0.097 mole) of 2-cyclohexyl-5-nitrobenzotrifluoride in 300 ml. methanol is added 0.6 gram platinum oxide and the mixture hydrogenated at room temperature and 40 p.s.i. The mixture is then filtered and the filtrate concentrated in vacuo, yielding 23.6 grams of the crude amine. The liquid residue crystallizes on standing several days. The mixture is filtered to yield solid 5-amino-2-cyclohexylbenzotrifluoride. M.P. 61–63° C.

A sample of the hydrochloride is prepared by dissolving some of the amine in chloroform and shaking with 2.5 N hydrochloric acid. The chloroform layer is dried and evaporated in vacuo to a crystalline residue. The solid is triturated with ether and dried in vacuo at room temperature.

Calc'd for $C_{13}H_{16}F_3N \cdot HCl$ (percent): C, 55.81; H, 6.13. Found (percent): C, 55.70; H, 6.34.

When (2,3-dichloro-4-nitrophenyl)-cyclohexane is used in place of 2-cyclohexyl-5-nitrobenzotrifluoride in the above example, there is obtained 4-amino-2,3-dichlorophenylcyclohexane.

EXAMPLE 18

4-cyclohexyl-5-trifluoromethylbenzonitrile

A mixture of 23.6 grams (0.097 mole) of 5-amino-2-cyclohexylbenzotrifluoride and 37 ml. concentrated hydrochloric acid in 37 ml. water is heated on the steam bath to 80° C., resulting in an insoluble white precipitate. The mixture is then diluted to a volume of 200 ml. with water and stirred at room temperature for ½ hour. The mixture is then cooled to −5° C. and 8.3 grams of sodium nitrite in 26 ml. water, cooled in an ice bath, is added dropwise, keeping the temperature at −5° C. A homogeneous solution is obtained and kept at −5° C.

A solution of 28.6 grams potassium cyanide in 52 ml. of water is added with stirring to a hot solution of 23.4 grams cupric sulfate in 95 ml. of water. The diazonium solution is then added in a stream to this solution while stirring and heating on the steam bath. After complete addition, the stirring and heating are continued for ½ hour. The reaction mixture is cooled and extracted with chloroform. The chloroform extract is dried and evaporated in vacuo, yielding 23.7 grams of crude product. This product is then dissolved in petroleum benzin and chromatographed on 711 grams of alkaline alumina, previously washed with acetone and petroleum benzin. The column is eluted with petroleum benzin to give 10.5 grams of crystalline product, M.P. 73–75° C.

Calc'd. for $C_{14}H_{14}F_3N$ (percent): C, 66.39; H, 5.57; N, 5.53; F, 22.51. Found (percent): C, 66.67; H, 5.85; N, 5.26; F, 21.9.

When (4 - amino-2,3-dichlorophenyl)-cyclohexane is used in place of 5-amino-2-cyclohexylbenzotrifluoride in the above example, there is obtained 4-cyano-2,3-dichlorophenylcyclohexane.

EXAMPLE 19

4-cyclohexyl-5-trifluoromethylacetophenone

A solution of 10.3 grams (0.04 mole) of 4-cyclohexyl-5-trifluoromethylbenzonitrile in 10 ml. dry ether is added dropwise over a one-hour period to a solution of methylmagnesium iodide (prepared from 3.6 ml. methyl iodide and 1.2 grams of magnesium in 50 ml. of dry ether). The reaction mixture is stirred overnight. The mixture is then poured into 68 grams of ice and 13.5 ml. of concentrated hydrochloric acid. The ether layer is separated, washed with water, dried over anhydrous magnesium sulfate, and evaporated in vacuo, yielding 10.4 grams of product.

When ethylmagnesium iodide is used in place of methylmagnesium iodide in the above example, there is obtained 4-cyclohexyl-5-trifluoromethylpropiophenone.

When (4 - cyano - 2,3-dichlorophenyl)-cyclohexane is used in place of 4-cyclohexyl-5-trifluoromethylbenzonitrile in the above example, there is obtained 4-cyclohexyl-2,3-dichloroacetophenone.

EXAMPLE 20

4-bromo-2,6-dichlorobiphenyl

To a solution of 0.05 mole of 4-bromo-2,6-dichloroaniline in 200 ml. dry benzene is added 0.07 mole of amyl nitrite and the resultant mixture heated slowly and carefully to reflux over a period of 1 hour. After refluxing overnight, the mixture is allowed to cool, extracted with (2× 50 ml.) dilute hydrochloric acid and water, and the benzene solution then dried over anhydrous magnesium sulfate. To the mixture is then added decolorizing carbon and the entire mixture is filtered. Silica gel (50 grams) is added to the dried filtrate solution and the mixture concentrated to dryness. The resultant crude packing is placed on a 500-gram silica gel column and eluted with petroleum ether, yielding 4-bromo-2,6-dichlorobiphenyl.

EXAMPLE 21

4-cyclohexyl-3,5-dichlorobromobenzene

A solution of 0.004 mole of 4-bromo-2,6-dichlorobiphenyl in 20 ml. glacial acetic acid is reduced with hydrogen at room temperature, 40 p.s.i., in the presence of 0.5 gram platinum oxide until 0.012 mole hydrogen is absorbed (the acetic acid-platinum oxide mixture is prereduced). The mixture is filtered and the filtrate concentrated in vacuo. The oily residue thus formed is taken up in benzene, washed with water, dried over anhydrous magnesium sulfate, filtered, silica gel (5 grams) added, and the mixture concentrated to dryness. The crude packing is then placed on a 100-gram silica gel column and eluted with petroleum ether, yielding 4-cyclobhexyl-3,5-dichlorobromobenzene.

EXAMPLE 22

Methyl-(4-cyclohexyl-3,5-dichlorophenyl)-carbinol

A dry 2-liter three-necked round-bottomed flask is equipped with a sealed stirrer, a 500-ml. dropping funnel, and an efficient reflux condsenser attached to a calcium chloride tube. To a mixture of 29.1 grams of magnesium turnings, a crystal of iodine, and about 50 ml. of dry ether is added a solution of 1.2 moles of 4-cyclohexyl-3,5-dichlorobromobenzene in 850 ml. of dry ether with stirring at a rate which maintains rapid refluxing (1–3 hours). The mixture is then stirred and heated on the steam bath under reflux for 1 hour after all the 4-cyclohexyl-3,5-dichlorobromobenzene has been added. A cooled solution of 1.4 moles of freshly distilled acetaldehyde in 200 ml. of dry ether is added over a period of 2–4 hours. The mixture is then stirred and heated under reflux for 1 hour after the addition is completed. The reaction mixture is then cooled in ice, and the addition compound is decomposed by adding dropwise with stirring 185 ml. of a 25% solution of ammonium chloride in water. The ether solution is then decanted and dried over anhydrous magnesium sulfate. After removal of the ether, the residue is purified by chromatography on a silica gel column (wt./wt. 50:1) using ether-petroleum ether (v./v. 20–70%) as eluent to obtain methyl-(4-cyclohexyl-3,5-dichlorophenyl)-carbinol.

EXAMPLE 23

4-cyclohexyl-3,5-dichloroacetophenone

To a cooled mixture of 3.0 grams of chromium trioxide in 30.5 ml. of dry pyridine while maintaining the temperature of the mixture at 10–15° C. is added dropwise a solution of 0.0073 mole of methyl-(4-cyclohexyl-3,5-dichlorophenyl)-carbinol in 18 ml. dry pyridine. After the addition is complete, the mixture is allowed to warm to and remain at room temperature overnight. The mixture is then poured onto a stirred ice-water mixture (ca.

300 ml.), acidified with dilute hydrochloric acid, and extracted with (2× 50 ml.) ether. The combined ether extractions are then washed with dilute hydrochloric acid, water, and dried over anhydrous magnesium sulfate and decolorizing carbon. The mixture is then filtered, concentrated to a residue, and chromatographed on a silica gel column (100 grams) using an ether-petroleum ether system (v./v. 10–60% ether-petroleum ether) as eluent to yield 4-cyclohexyl-3,5-dichloroacetophenone.

EXAMPLE 23A

The procedure of Example 3C is followed using the 3-acetamido compounds obtained from Examples 3D, 4, 5, 6 and 7 in place of 3-acetamido-4-cyclohexyl-5-nitroacetophenone to form the corresponding 3-amino compounds.

EXAMPLE 24

α-Hydroxy-α-methyl-3-chloro-4-cyclohexylphenyl acetamide

To 2.0 cc. of stirred and cooled liquid HCN is added dropwise 2.37 grams of 3-chloro-4-cyclohexylacetophenone followed by 5 drops of piperidine. The reaction mixture is kept at 0° C. for 1 hour and then poured into 25 cc. of concentrated hydrochloric acid which has been cooled to 0° C. The mixture is then saturated with gaseous hydrogen chloride, stirred 2 hours at 0° C., and then stirred overnight at room temperature. The reaction mixture is then extracted well with (2× 50 ml.) ether. The combined ether extracts are washed with water, dried over sodium sulfate, and concentrated. The residue is then dried under vacuum and they recrystallized from benzene-petroleum ether and benzene-hexane to yield 1.2 grams of α-hydroxy-α-methyl-3-chloro-4-cyclohexylphenyl acetamide. M.P. 161–163° C.

When 3-bromo-4-cyclohexylacetophenone,
3-chloro-4-cyclopentylacetophenone,
3-chloro-4-secondarybutylacetophenone,
4-cyclohexyl-2,5-dichloroacetophenone,
2-bromo-5-chloro-4-cyclohexylacetophenone,
5-bromo-2-chloro-4-cyclohexylacetophenone,
4-cyclohexyl-5-trifluoromethylacetophenone,
4-cyclohexyl-2,3-dichloroacetophenone,
4-cyclohexyl-3,5-dichloroacetophenone,
3-chloro-4-cyclohexylpropiophenone,
4-cyclohexyl-3-trifluoromethylpropiophenone,
4-cyclohexyl-3-nitroacetophenone,
5-chloro-4-cyclohexyl-2-nitroacetophenone,
4-cyclohexyl-3-methylsulfonylacetophenone and
3-acetamido-2-amino-4-cyclohexylacetophenone,
3-acetamido-5-amino-4-cyclohexylacetophenone,
3-acetamido-6-amino-4-cyclohexylacetophenone,
3-acetamido-2-chloro-4-cyclohexylacetophenone,
3-acetamido-5-chloro-4-cyclohexylacetophenone,
3-acetamido-6-chloro-4-cyclohexylacetophenone,
3-acetamido-2-mercapto-4-cyclohexylacetophenone,
3-acetamido-5-mercapto-4-cyclohexylacetophenone,
3-acetamido-6-amino-4-cyclohexylacetophenone,
3-acetamido-2-methylmercapto-4-cyclohexylacetophenone,
3-acetamido-5-methylmercapto-4-cyclohexylacetophenone,
3-acetamido-6-methylmercapto-4-cyclohexylacetophenone,
3-acetamido-2-methylsulfonyl-4-cyclohexylacetophenone,
3-acetamido-5-methylsulfonyl-4-cyclohexylacetophenone,
3-acetamido-6-methylsulfonyl-4-cyclohexylacetophenone,
3-amino-2-amino-4-cyclohexylacetophenone,
3-amino-5-amino-4-cyclohexylacetophenone,
3-amino-6-amino-4-cyclohexylacetophenone,
3-amino-2-chloro-4-cyclohexylacetophenone,
3-amino-5-chloro-4-cyclohexylacetophenone,
3-amino-6-chloro-4-cyclohexylacetophenone,
3-amino-2-mercapto-4-cyclohexylacetophenone,
3-amino-5-mercapto-4-cyclohexylacetophenone,
3-amino-6-mercapto-4-cyclohexylacetophenone,
3-amino-2-methylmercapto-4-cyclohexylacetophenone,
3-amino-5-methylmercapto-4-cyclohexylacetophenone,
3-amino-6-methylmercapto-4-cyclohexylacetophenone,
3-amino-2-methylsulfonyl-4-cyclohexylacetophenone,
3-amino-5-methylsulfonyl-4-cyclohexylacetophenone,
3-amino-6-methylsulfonyl-4-cyclohexylacetophenone,
3-amino-4-cyclohexyl-2-nitroacetophenone,
3-amino-4-cyclohexyl-5-nitroacetophenone, and
3-amino-4-cyclohexyl-6-nitroacetophenone are used in place of 3-chloro-4-cyclohexylacetophenone in the above example, there are obtained α-hydroxy-α-methyl-3-bromo-4-cyclohexylphenyl acetamide,
α-hydroxy-α-methyl-3-chloro-4-cyclopentylphenyl acetamide,
α-hydroxy-α-methyl-3-chloro-4-secondarybutylphenyl acetamide,
α-hydroxy-α-methyl-4-cyclohexyl-2,5-dichlorophenyl acetamide,
α-hydroxy-α-methyl-2-bromo-5-chloro-4-cyclohexylphenyl acetamide,
α-hydroxy-α-methyl-5-bromo-2-chloro-4-cyclohexylphenyl acetamide,
α-hydroxy-α-methyl-4-cyclohexyl-5-trifluoromethylphenyl acetamide (M.P. 97–99° C.),
α-hydroxy-α-methyl-4-cyclohexyl-2,3-dichlorophenyl acetamide,
α-hydroxy-α-methyl-4-cyclohexyl-3,5-dichlorophenyl acetamide,
α-ethyl-α-hydroxy-3-chloro-4-cyclohexylphenyl acetamide (M.P. 158–159° C.),
α-ethyl-α-hydroxy-4-cyclohexyl-3-trifluoromethylphenyl acetamide,
α-hydroxy-α-methyl-4-cyclohexyl-3-nitrophenyl acetamide,
α-hydroxy-α-methyl-5-chloro-4-cyclohexyl-2-nitrophenyl acetamide,
α-hydroxy-α-methyl-4-cyclohexyl-3-methylsulfonylphenyl acetamide and
α-hydroxy-α-methyl-3-substituted, 2-, 5- and 6-substituted-4-cyclohexylphenyl acetamide compounds, respectively.

EXAMPLE 25

α-Hydroxy-α-methyl-3-amino-4-cyclohexylphenyl acetamide

To a solution of 0.12 mole of α-hydroxy-α-methyl-4-cyclohexyl-3-nitrophenyl acetamide in 250 ml. of absolute alcohol is added 0.5 gram of platinum oxide. The mixture is hydrogenated at room temperature for 1 hour. The product is then dissolved as much as possible by heating on a steam bath and filtered. The moist cake is dissolved in 500 ml. of hot ethanol and the catalyst is removed by filtration. After removal of the solvent in vacuo, the product is dissolved in ether, extracted with 2 N hydrochloric acid, and recovered by neutralization and extraction of the aqueous layer with ether. The ether extract is then dried over sodium sulfate, filtered, and the solvent removed to obtain a residue of α-hydroxy-α-methyl-3-amino-4-cyclohexylphenyl acetamide.

When α-hydroxy-α-methyl - 5 - chloro-4-cyclohexyl-2-nitrophenyl acetamide is used in place of α-hydroxy-α-methyl-4-cyclohexyl-3-nitrophenyl acetamide in the above example, there is obtained α-hydroxy-α-methyl-2-amino-5-chloro-4-cyclohexylphenyl acetamide.

Similarly, when the 2-, 5- and 6-nitrophenyl acetamide compounds obtained from Example 24 are used in place of the α-hydroxy-α-methyl - 4 - cyclohexyl-3-nitrophenyl acetamide in the above example, there are obtained the corresponding α-hydroxy-α-methyl-2-, 5- and 6-amino acetamide compounds.

EXAMPLE 26

α-Hydroxy-α-methyl-3-chloro-4-cyclohexylphenyl acetic acid 0.88 grams of α-hydroxy-α-methyl-3-chloro-4-cyclohexylphenyl acetamide is refluxed overnight in 20 cc. of ethanol-water 1:1 containing 1.0 gram of sodium hydroxide. There is added 40 cc. water and the reaction mixture is heated to remove the ethanol. The aqueous alkaline solution is then filtered, acidified, and the resulting mixture extracted well with (2× 50 ml.) ether. The combined ether extracts are washed with water, dried over sodium sulfate, and concentrated. The resulting solid is recrystallized from benzene-petroleum ether to yield 0.45 gram of α-hydroxy-α-methyl - 3 - chloro-4-cyclohexylphenyl acetic acid. M.P. 147–149° C.

When

α-hydroxy-α-methyl-3-bromo-4-cyclohexylphenyl acetamide,
α-hydroxy-α-methyl-3-chloro-4-cyclopentylphenyl acetamide,
α-hydroxy-α-methyl-3-chloro-4-secondarybutylphenyl acetamide,
α-hydroxy-α-methyl-4-cyclohexyl-2,5-dichlorophenyl acetamide,
α-hydroxy-α-methyl-2-bromo-5-chloro-4-cyclohexyl phenyl acetamide,
α-hydroxy-α-methyl-5-bromo-2-chloro-4-cyclohexylphenyl acetamide,
α-hydroxy-α-methyl-4-cyclohexyl-5-trifluoromethylphenyl acetamide,
α-hydroxy-α-methyl-4-cyclohexyl-2,3-dichlorophenyl acetamide,
α-hydroxy-α-methyl-4-cyclohexyl-3,5-dichlorophenyl acetamide,
α-ethyl-α-hydroxy-3-chloro-4-cyclohexylphenyl acetamide,
α-ethyl-α-hydroxy-4-cyclohexyl-5-trifluoromethylphenyl acetamide,
α-hydroxy-α-methyl-4-cyclohexyl-3-nitrophenyl acetamide,
α-hydroxy-α-methyl-5-chloro-4-cyclohexyl-2-nitrophenyl acetamide,
α-hydroxy-α-methyl-3-amino-4-cyclohexylphenyl acetamide,
α-hydroxy-α-methyl-2-amino-5-chloro-4-cyclohexylphenyl acetamide,
α-ethyl-α-hydroxy-3-amino-4-cyclohexylphenyl acetamide,
α-hydroxy-α-methyl-4-cyclohexyl-3-methylsulfonylphenyl acetamide, the α-hydroxy-α-methyl-3-substituted, 2-, 5- and 6-substituted-4-cyclohexylphenyl acetamide compounds obtained from Example 24 and the α-hydroxy-α-methyl-2-, 5- and 6-amino acetamide compounds obtained from Example 25 are used in place of α-hydroxy-α-methyl-3-chloro-4-cyclohexylphenyl acetamid e in the above example, there are obtained α-hydroxy-α-methyl-3-bromo-4-cyclohexylphenyl acetic acid,
α-hydroxy-α-methyl-3-chloro-4-cyclopentylphenyl acetic acid,
α-hydroxy-α-methyl-3-chloro-4-secondary-butylphenyl acetic acid,
α-hydroxy-α-methyl-4-cyclohexyl-2,5-dichlorophenyl acetic acid,
α-hydroxy-α-methyl-2-bromo-5-chloro-4-cyclohexylphenyl acetic acid,
α-hydroxy-α-methyl-5-bromo-2-chloro-4-cyclohexylphenyl acetic acid,
α-hydroxy-α-methyl-4-cyclohexyl-5-trifluoromethylphenyl acetic acid,
α-hydroxy-α-methyl-4-cyclohexyl-2,3-dichlorophenyl acetic acid,
α-hydroxy-α-methyl-4-cyclohexyl-3,5-dichlorophenyl acetic acid,
α-ethyl-α-hydroxy-3-chloro-4-cyclohexylphenyl acetic acid (M.P. 134.5–135.5° C.),
α-ethyl-α-hydroxy-4-cyclohexyl-5-trifluoromethylphenyl acetic acid (M.P. 120–122° C.),
α-hydroxy-α-methyl-4-cyclohexyl-3-nitrophenyl acetic acid,
α-hydroxy-α-methyl-5-chloro-4-cyclohexyl-2-nitrophenyl acetic acid,
α-hydroxy-α-methyl-3-amino-4-cyclohexylphenyl acetic acid,
α-hydroxy-α-methyl-2-amino-5-chloro-4-cyclohexylphenyl acetic acid,
α-ethyl-α-hydroxy-3-amino-4-cyclohexylphenyl acetic acid,
α-hydroxy-α-methyl-4-cyclohexyl-3-methylsulfonylphenyl acetic acid, the α-hydroxy-α-methyl-3-substituted, 2-, 5- and 6-substituted-4-cyclohexylphenyl acetic acids and the α-hydroxy-α-methyl-2-, 5- and 6-amino acetic acid compounds, respectively.

EXAMPLE 27

α-Ethyl-α-hydroxy-4-cyclohexyl-3-hydroxyphenyl acetic acid

To 2.6 grams (0.01 mole) of α-ethyl-α-hydroxy-3-amino-4-cyclohexylphenyl acetic acid suspended in 50 ml. of water is added 2.0 ml. of concentrated sulfuric acid. The resulting suspension of the sulfate salt is cooled to 5° C., and a solution of 0.7 gram (0.011 mole) of sodium nitrite in 10 ml. of water is added slowly. The solution of diazonium salt is heated at 65° C. until evolution of nitrogen ceases; it is then cooled and extracted with ether. The ethereal solution is washed with water, dried over magnesium sulfate, treated with charcoal, filtered, and concentrated to approximately 10 ml. Addition of 1–2 volumes of hexane causes the α-ethyl-α-hydroxy-4-cyclohexyl-3-hydroxyphenyl acetic acid to crystallize: 1.7 grams, M.P. 165–166° C.

When the α-hydroxy-α-methyl-2-, 5- and 6-amino acetic acid compounds obtained from Example 26 are used in place of α-ethyl-α-hydroxy-3-amino-4-cyclohexylphenyl acetic acid in the above example, there are obtained the corresponding α-hydroxy-α-methyl-2-, 5- and 6-hydroxy acetic acid compounds.

EXAMPLE 28

α-Ethyl-α-hydroxy-4-cyclohexyl-3-fluorophenyl acetic acid

A solution of 2.6 grams (0.01 mole) of α-ethyl-α-hydroxy-3-amino-4-cyclohexylphenyl acetic acid in 5 ml. of tetrahydrofuran is added to a solution of 10 ml. of 50% fluoboric acid in 5 ml. of water. The clear solution is cooled to 5° C. and is diazotized with 1.4 grams (0.02 mole) of sodium nitrite in 4 ml. of water. After the addition of 10 ml. of 50% fluoboric acid, the supernatant is decanted from the oily diazonium compound. The latter is warmed with 30 ml. of toluene on the steam bath until evolution of nitrogen ceases. The cooled mixture is extracted with dilute sodium hydroxide solution. The alkaline solution is treated with charcoal, filtered, acidified, and extracted with ether. The ethereal solution is percolated through a short column of alumina, which is then eluted with ether. Evaporation of the solvent furnishes α-ethyl-α-hydroxy-4 - cyclohexyl-3-fluorophenyl acetic acid. M.P. 163–165° C.

When the α-hydroxy-α-methyl-2-, 5- and 6-amino acetic acid compounds obtained from Example 26 are used in place of α-ethyl-α-hydroxy-3-amino-4-cyclohexylphenyl acetic acid in the above example, there are obtained the corresponding α-hydroxy-α-methyl-2-, 5- and 6-fluoro acetic acid compounds.

EXAMPLE 29

α-Methylene-3-chloro-4-cyclohexylphenyl acetic acid

A solution of 5.0 grams of α-hydroxy-α-methyl-3-chloro-4-cyclohexylphenyl acetic acid and 2.0 grams of p-toluenesulfonic acid in 100 cc. toluene is refluxed for 3 hours. The reaction mixture is cooled, 50 cc. ether added, the resulting solution is washed well with water, dried over sodium sulfate, and concentrated in vacuo. The residue thus obtained is crystallized from hexane to yield 4.1 grams of α-methylene-3-chloro-4-cyclohexylphenyl acetic acid. M.P. 129–131° C.

When

α-hydroxy-α-methyl-3-bromo-4-cyclohexylphenyl acetic acid,
α-hydroxy-α-hydroxy-α-methyl-3-chloro-4-cyclopentylphenyl acetic acid,
α-hydroxy-α-methyl-3-chloro-4-secondarybutylphenyl acetic acid,
α-hydroxy-α-methyl-4-cyclohexyl-2,5-dichlorophenyl acetic acid,
α-hydroxy-α-methyl-2-bromo-5-chloro-4-cyclohexylphenyl acetic acid,
α-hydroxy-α-methyl-5-bromo-2-chloro-4-cyclohexylphenyl acetic acid,
α-hydroxy-α-methyl-4-cyclohexyl-5-trifluoromethylphenyl acetic acid,
α-hydroxy-α-methyl-4-cyclohexyl-2,3-dichlorophenyl acetic acid,
α-hydroxy-α-methyl-4-cyclohexyl-3,5-dichlorophenyl acetic acid,
α-ethyl-α-hydroxy-3-chloro-4-cyclohexylphenyl acetic acid,
α-ethyl-α-hydroxy-4-cyclohexyl-5-trifluoromethylphenyl acetic acid,
α-hydroxy-α-methyl-4-cyclohexyl-3-nitrophenyl acetic acid,
α-hydroxy-α-methyl-5-chloro-4-cyclohexyl-2-nitrophenyl acetic acid,
α-hydroxy-α-methyl-3-amino-4-cyclohexylphenyl acetic acid,
α-hydroxy-α-methyl-2-amino-5-chloro-4-cyclohexylphenyl acetic acid,
α-hydroxy-α-methyl-4-cyclohexyl-3-methylsulfonylphenyl acetic acid,
α-hydroxy-α-methyl-3-substituted-2-, 5- and 6-substituted-4-cyclohexylphenyl acetic acid compounds, the α-hydroxy-α-methyl-2-, 5- and 6-amino acetic acid compounds obtained from Example 26, the α-hydroxy-α-methyl-2-, 5- and 6-hydroxy acetic acid compounds obtained from Example 27 and the α-hydroxy-αmethyl-2-, 5- and 6-fluoro acetic acid compounds obtained from Example 28 are used in place of α-hydroxy-α-methyl-3-chloro-4-cyclohexylphenyl acetic acid in the above example, there are obtained α-methylene-3-bromo-4-cyclohexylphenyl acetic acid,
α-methylene-3-chloro-4-cyclopentylphenyl acetic acid,
α-methylene-3-chloro-4-secondarybutylphenyl acetic acid,
α-methylene-4-cyclohexyl-2,5-dichlorophenyl acetic acid,
α-methylene-2-bromo-5-chloro-4-cyclohexylphenyl acetic acid,
α-methylene-5-bromo-2-chloro-4-cyclohexylphenyl acetic acid,
α-mthylene-4-cyclohexyl-5-trifluoromethylphenyl acetic acid,
α-methylene-4-cyclohexyl-2,3-dichlorophenyl acetic acid,
α-methylene-4-cyclohexyl-3,5-dichlorophenyl acetic acid,
α-ethylidene-3-chloro-4-cyclohexylphenyl acetic acid (M.P. 175–176° C.),
α-ethylidene-4-cyclohexyl-5-trifluoromethylphenyl acetic acid,
α-methylene-4-cyclohexyl-3-nitrophenyl acetic acid,
α-methylene-5-chloro-4-cyclohexyl-2-nitrophenyl acetic acid,
α-methylene-3-amino-4-cyclohexylphenyl acetic acid,
α-methylene-2-amino-5-chloro-4-cyclohexylphenyl acetic acid,
α-methylene-4-cyclohexyl-3-methylsulfonylphenyl acetic acid,
α-methylene-3-substituted-2-, 5- and 6-substituted-4-cyclohexylphenyl acetic acid compounds,
α-methylene-2-, 5- and 6-amino acetic acid compounds,
α-methylene-2-, 5- and 6-hydroxy acetic acid compounds and
α-methylene-2-, 5- and 6-fluoro acetic acid compounds, respectively.

EXAMPLE 30

α-Methyl-3-chloro-4-cyclohexylphenyl acetic acid

A solution of 2.33 grams of α-methylene-3-chloro-4-cyclohexylphenyl acetic acid in 25 cc. of ethanol containing 0.1 gram platinum oxide is treated with hydrogen at room temperature. After the required amount of hydrogen has been taken up, the reaction mixture is filtered and concentrated to an oil which solidifies upon the addition of petroleum ether. Recrystallization from hexane gives 1.4 grams of α-methyl-3-chloro-4-cyclohexylphenyl acetic acid. M.P. 84–85.5° C.

When using

α-methylene-3-bromo-4-cyclohexylphenyl acetic acid,
α-methylene-3-chloro-4-cyclopentylphenyl acetic acid,
α-methylene-3-chloro-4-secondarybutylphenyl acetic acid,
α-methylene-4-cyclohexyl-2,5-dichlorophenyl acetic acid,
α-methylene-2-bromo-5-chloro-4-cyclohexylphenyl acetic acid,
α-methylene-5-bromo-2-chloro-4-cyclohexylphenyl acetic acid,
α-methylene-4-cyclohexyl-5-trifluoromethylphenyl acetic acid,
α-methylene-4-cyclohexyl-2,3-dichlorophenyl acetic acid,
α-methylene-4-cyclohexyl-3,5-dichlorophenyl acetic acid,
α-ethylidene-3-chloro-4-cyclohexylphenyl acetic acid,
α-ethylidene-4-cyclohexyl-5-trifluoromethylphenyl acetic acid,
α-methylene-3-amino-4-cyclohexylphenyl acetic acid,
α-methylene-2-amino-5-chloro-4-cyclohexylphenyl acetic acid,
α-methylene-4-cyclohexyl-3-methylsulfonylphenyl acetic acid, and
α-methylene-3-substituted, 2-, 5- and 6-substituted-4-cyclohexylphenyl acetic acid compounds,
α-methylene-2-, 5- and 6-amino acetic acid compounds,
α-methylene-2-, 5- and 6-hydroxy acetic acid compounds and
α-methylene-2-, 5- and 6-fluoro acetic acid compounds obtained from Example 29 in place of α-methylene-3-chloro-4-cyclohexylphenyl acetic acid in the above example, there are obtained α-methyl-3-bromo-4-cyclohexylphenyl acetic acid,
α-methyl-3-chloro-4-cyclopentylphenyl acetic acid,
α-methyl-3-chloro-4-secondarybutylphenyl acetic acid,
α-methyl-4-cyclohexyl-2,5-dichlorophenyl acetic acid (M.P. 165–167° C.),
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid (M.P. 104–106° C.),
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid (M.P. 97–98° C.),
α-ethyl-4-cyclohexyl-5-trifluoromethylphenyl acetic acid,
α-methyl-3-amino-4-cyclohexylphenyl acetic acid,
α-methyl-2-amino-5-chloro-4-cyclohexylphenyl acetic acid, α-methyl-4-cyclohexyl-3-methylsulfonylphenyl acetic acid,
α-methyl-3-substituted,
2-, 5- and 6-substituted-4-cyclohexylphenyl acetic acid compounds,
α-mthyl-2-, 5- and 6-amino acetic acid compounds,
α-methyl-2-, 5- and 6-hydroxy acetic acid compounds and
α-methyl-2-, 5- and 6-fluoro acetic acid compounds, respectively.

EXAMPLE 31

α-Methyl-3-chloro-4-cyclohexylphenyl acetic acid

To a solution of 1.8 grams of α-hydroxy-α-methyl-3-chloro-4-cyclohexylphenyl acetic acid in 40 ml. of glacial acetic acid is added 0.79 gram of phosphorus and 0.32 gram of iodine. The mixture is then refluxed for 16 hours, filtered while hot, and the filtrate poured into 150 ml. of ice water. The mixture is then filtered and the cake thus obtained dissolved in chloroform, washed with water, dried over magnesium sulfate, charcoaled, and the solvent removed in vacuo. The residue is esterified by refluxing with 15 ml. of methanol and 0.15 ml. of sulfuric acid for 3 hours. The solution is then diluted with ether and the reaction mixture then washed freely of sulfuric acid (with water), dried over magnesium sulfate, and concentrated in vacuo. The methyl ester thus obtained is chromatographed on 75 grams of silica gel using a benzene-petroleum ether system. Two compounds are obtained, which are later saponified separately. The larger fraction is dissolved in 20 ml. of 95% ethanol to which 0.7 gram of potassium hydroxide in 3 ml. of water is added. The mixture is then refluxed for 5 hours, diluted with water, and most of the methanol removed in vacuo. At this point, the solution is acidified with cold 6 N hydrochloric acid. The desired α-methyl-3-chloro-4-cyclohexylphenyl acetic acid is obtained by filtration from the acetic solution and recrystallization from ice-cold hexane. The second product obtained during the phosphorus iodine reduction and subsequently isolated as the methyl ester is the unsaturated analogue, α-methylene-3-chloro-4-cyclohexylphenyl acetic acid. M.P. 129–131° C.

EXAMPLE 32

Hydrochloride of α-ethyl-4-cyclohexyl-3-dimethylaminophenyl acetic acid

To a solution of 1.42 grams (0.005 mole) of the hydrochloride of α-ethyl-3-amino-4-cyclohexylphenyl acetic acid in 50 cc. methanol is added 0.5 gram of anhydrous sodium acetate, 4 cc. of 37% formaldehyde, and 1.5 grams of 10% palladium on charcoal. The mixture is then hydrogenated at room temperature and 40 p.s.i. The reaction mixture is filtered and the solids washed with fresh methanol. The combined methanol filtrate is then evaporated in vacuo and the residue is extracted with boiling benzene. Evaporation in vacuo of the benzene extract results in a residual yellow oil. This oil is dissolved in concentrated hydrochloric acid, filtered, and diluted with water to precipitate an oil, which soon crystallizes. The solid is filtered and washed with cold dilute hydrochloric acid. An additional amount of product is obtained from the filtrate. The product is air dried at room temperature and the analytical data indicates that there is solvation with one mole of water.

When the α-methyl-2-, 5- and 6-amino acetic acid compounds obtained from Example 30 are used in place of α-ethyl-3-amino-4-cyclohexylphenyl acetic acid in the above example, there are obtained the corresponding α-methyl-2-, 5- and 6-dimethylamino acetic acid compounds.

EXAMPLE 33

α-Ethyl-3-acetylamino-4-cyclohexylphenyl acetic acid

When α-ethyl-α-hydroxy-3-amino-4 - cyclohexylphenyl acetic acid is treated with phosphorus and iodine in acetic acid solution, as in Example 31, the product is α-ethylidene-3-acetylamino-4-cyclohexylphenyl acetic acid, M.P. 197–199° C. The latter compound is then hydrogenated, as described in Example 30, to obtain α-ethyl-3-acetylamino-4-cyclohexylphenyl acetic acid, M.P. 181–182° C.

When the α-hydroxy-α-methyl-2-, 5- and 6-amino acetic acid compounds obtained from Example 26 are used in place of α-ethyl-α-hydroxy-3-amino-4 - cyclohexylphenyl acetic acid in the above example, there are obtained the corresponding α-methyl-2-, 5- and 6-acetylamino acetic acid compounds.

EXAMPLE 34

α-Ethyl-4-cyclohexyl-3-methoxyphenyl acetic acid

A solution of 0.5 gram of α-ethyl-4-cyclohexyl-3-hydroxyphenyl acetic acid in 2.5 ml. of 2.5 N sodium hydroxide solution is treated with 0.6 ml. of dimethyl sulfate and the mixture heated at 95° C. with stirring for 0.5 hour, at which time 0.5 ml. of 2.5 N sodium hydroxide solution is added. Heating is continued for 0.5 hour more, at which time 3.0 ml. of 2.5 N sodium hydroxide solution and 0.5 ml. of dimethyl sulfate are added. Heating and stirring are then continued for 16 hours. 5 ml. of 2.5 N sodium hydroxide solution are subsequently added, and the mixture is heated at reflux for 1 hour. The mixture is cooled, acidified with hydrochloric acid. The product is extracted into ether, washed with water, dried with magnesium sulfate, and the solvent expelled. Trituration with hexane yields 0.37 gram of α-ethyl-4-cyclohexyl-3-methoxyphenyl acetic acid, M.P. 134–135° C.

When the α-methyl-2-, 5- and 6-hydroxy acetic acid compounds obtained from Example 30 are used in place of α-ethyl-4-cyclohexyl-3-hydroxyphenyl acetic acid in the above example, there are obtained the corresponding α-methyl-2-, 5- and 6-methoxy acetic acid compounds.

EXAMPLE 35

α-Methyl-3-cyano-4-cyclohexylphenyl acetic acid

A mixture of 10 millimoles of α-methyl-3-amino-4-cyclohexylphenyl acetic acid, 3 ml. of concentrated hydrochloric acid, and 15 grams of ice is diazotized by adding a concentrated aqueous solution of sodium nitrite until a slight excess of nitrous acid is present. The solution is carefully neutralized by adding solid sodium carbonate and is then added slowly to a solution of 15 millimoles of cuprous cyanide and 30 millimoles of potassium cyanide in 10 ml. of water kept at 5° C. The temperature of the solution is slowly increased to 50–60° C. until the diazonium salt has decomposed. After cooling, the mixture is rendered acidic and is extracted with benzene. The benzene solution is dried and chromatographed on silica gel to obtain α-methyl-3-cyano-4-cyclohexylphenyl acetic acid.

When the α-methyl-2-, 5- and 6-amino acetic acid compounds obtained from Example 30 are used in place of α-methyl-3-amino-4-cyclohexylphenyl acetic acid in the above example, there are obtained the corresponding α-methyl-2-, 5- and 6-cyano acetic acid compounds.

EXAMPLE 36

α-Methyl-3-carboxamido-4-cyclohexylphenyl acetic acid

Two grams of α-methyl-3-cyano-4-cyclohexylphenyl acetic acid are dissolved in 10 ml. of concentrated sulfuric acid and kept at room temperature for 24 hours. The solution is poured into 150 ml. of ice-water mixture, the precipitated product collected and chromatographed on silica gel to obtain α-methyl-2-carboxamido-4-cyclohexylphenyl acetic acid.

When the α-methyl-2-, 5- and 6-cyano acetic acid compounds obtained from Example 35 are used in place of α-methyl-3-cyano-4-cyclohexylphenyl acetic acid in the above example, there are obtained the corresponding α-methyl-2-, 5- and 6-carboxamido acetic acid compounds.

EXAMPLE 37

Methyl α-methyl-4-cyclohexylphenyl acetate

A mixture of 0.01 mole of α-methyl-4-cyclohexylphenyl acetic acid and 8 ml. of concentrated sulfuric acid and 250 ml. of anhydrous methanol (ca. 3% sulfuric acid) is stirred at room temperature overnight. The solution is then concentrated in vacuo to approximately ⅓ the volume. 80 ml. of water are added and the mixture extracted with (3× 50 ml.) ether. The combined ether extracts are washed with saturated potassium bicarbonate solution and water. The ether solution is then dried over magnesium sulfate, filtered, and concentrated to a residue. The residue is then chromatographed on a silica gel column (wt./wt. 50:1 gram crude) using an ether-petroleum ether system (v./v. 20–60%) as eluent to obtain methyl α-methyl-4-cyclohexylphenyl acetate.

When α-ethyl-4-cyclohexylphenyl acetic acid, α-methyl-4-cyclopentylphenyl acetic acid, and α-methyl-4-secondarybutylphenyl acetic acid are used in place of α-methyl-4-cyclohexylphenyl acetic acid in the above example, there are obtained methyl α-ethyl-4-cyclohexylphenyl acetate, methyl α-methyl-4-cyclopentylphenyl acetate, and methyl α-methyl-4-secondarybutylphenyl acetate respectively.

EXAMPLE 38

Methyl α-methyl-4-cyclohexyl-3-nitrophenyl acetate

To 100 ml. of concentrated sulfuric acid maintained at −5° to 5° C. is added while stirring 0.03 mole of methyl α-methyl-4-cyclohexylphenyl acetate. There is then added dropwise 15 cc. of fuming nitric acid, the temperature being maintained at −5° to 5° C. during the addition and for 1 hour afterward. The reaction mixture is then poured onto ice and extracted with ether. The combined ether extracts are washed well with water, dried over sodium sulfate, and concentrated to a residue. The residue is then chromatographed on 500 grams of silica gel. Elution with 10% ether-petroleum ether yields methyl α-methyl-4-cyclohexyl-3-nitrophenyl acetate.

When using methyl α-ethyl-4-cyclohexylphenyl acetate, methyl α-methyl-4-cyclopentylphenyl acetate, and methyl α-methyl-4-secondarybutylphenyl acetate in place of methyl α-methyl-4-cyclohexylphenyl acetate in the above example, there are obtained methyl α-ethyl-4-cyclohexyl-3-nitrophenyl acetate, methyl α-methyl-4-cyclopentyl-3-nitrophenyl acetate, and methyl α-methyl-3-nitro-4-secondary butylphenyl acetate respectively.

EXAMPLE 39

α-Methyl-4-cyclohexyl-3-nitrophenyl acetic acid

To a solution of 5 ml. of 10 N aqueous potassium hydroxide is added a solution of 0.02 mole of methyl α-methyl-4-cyclohexyl-3-nitrophenyl acetate in 45 ml. of ethanol and the combined solutions stirred at room temperature overnight. The ethanol is then removed in vacuo, 100 ml. of water added, and the mixture extracted with (2× 50 ml.) ether. The aqueous layer is then filtered, acidified with dilute aqueous hydrochloric acid, and the mixture filtered. The resulting cake is washed several times with water and dried in vacuo to yield α-methyl-4-cyclohexyl-3-nitrophenyl acetic acid.

When methyl α-ethyl - 4 - cyclohexyl - 3 - nitrophenyl acetate, methyl α-methyl - 4 - cyclopentyl - 3 - nitrophenyl acetate, and methyl α-methyl - 3 - nitro-4-secondarybutyl phenyl acetate are used in place of methyl α-methyl - 4 - cyclohexyl-3-nitrophenyl acetate in the above example, there are obtained α-ethyl-4-cyclohexyl - 3 - nitrophenyl acetic acid, α-methyl - 4 - cyclopentyl - 3 - nitrophenyl acetic acid and α-methyl - 3 - nitro - 4 - secondarybutyl- phenyl acetic acid respectively.

EXAMPLE 40

Sodium α-methyl-3-chloro-4-cyclohexylphenyl acetate

A solution of 0.01 mole of sodium hydroxide in 15 ml. of water is added with stirring to a solution of 0.01 mole of α-methyl - 3 - chloro - 4 - cyclohexylphenyl acetic acid in 25 ml. of methanol. At this point, additional methanol is added as needed to obtain complete solution and the solution stirred for 1 hour. The solution is then evaporated in vacuo to obtain a residue of sodium α-methyl-3-chloro-4-cyclohexylphenyl acetate.

When potassium hydroxide is used in place of sodium hydroxide in the above example, there is obtained the corresponding potassium salt.

When ethylamine, N,N-dimethylaminoethanol, N,N-diethylethanolamine, triethylamine, piperazine, morpholine, and choline are used in place of sodium hydroxide in the above example and are dissolved in methanol in place of water, there are obtained the corresponding ethylamine, N,N - dimethylaminoethanol, N,N - diethylethanolamine, triethylamine, piperazine, morpholine, and choline α-methyl-3-chloro - 4 - cyclohexylphenyl acetic acid salts, respectively.

When

α-methyl-3-bromo-4-cyclohexylphenyl acetic acid,
α-methyl-3-chloro-4-cyclopentylphenyl acetic acid,
α-methyl-3-chloro-4-secondarybutylphenyl acetic acid,
α-methyl-4-cyclohexyl-2,5-dichlorophenyl acetic acid,
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-nitrophenyl acetic acid,
α-methyl-5-chloro-4-cyclohexyl-2-nitrophenyl acetic acid,
α-methyl-3-amino-4-cyclohexylphenyl acetic acid,
α-methyl - 2 - amino - 5 - chloro-4-cyclohexylphenyl acetic acid,
α-methyl-4-cyclohexyl-3-methylsulfonylphenyl acetic acid,
α-methyl-3-cyano-4-cyclohexylphenyl acetic acid,
α-methyl-3-amino-4-cyclohexylphenyl acetic acid,
α-methyl-4-cyclohexyl-3-dimethylaminephenyl acetic acid,
α-methyl-4-cyclohexyl-3-methoxyphenyl acetic acid,
α-methyl-3-carboxamido-4-cyclohexylphenyl acetic acid,
α-methyl-3-acetylamino-4-cyclohexylphenyl acetic acid,
α-methyl-4-cyclohexyl-3-hydroxyphenyl acetic acid,
α-methyl-4-cyclohexyl - 3 - methylsulfamylphenyl acetic acid.
α-methyl-3-substituted, 2-, 5- and 6-substituted-4-cyclohexylphenyl acetic acid compounds,
α-methyl-2-, 5- and 6-amino acetic acid compounds,
α-methyl-2-, 5- and 6-hydroxy acetic acid compounds, and
α-methyl-2-, 5- and 6-fluoro acetic acid compounds obtained from Example 30 are used in place of α-methyl-3-chloro-4-cyclohexylphenyl acetic acid in the above example, there are obtained the corresponding sodium salts.

EXAMPLE 41

2-(3-chloro-4-cyclohexylphenyl)-1-propanol

To a well-stirred suspension of 0.005 mole of lithium aluminum hydride in 250 cc. of anhydrous ether is added dropwise a solution of 0.01 mole of α-methyl-3-chloro-4-cyclohexylphenyl acetic acid with ice-cooling. The reaction mixture is stirred at room temperature for 1 hour, after which time 10 cc. of water is added dropwise with ice-cooling. The reaction mixture is poured into dilute sulfuric acid and the aqueous layer is extracted well with (2×25 ml.) ether. The combined ether extracts are washed with water, dilute bicarbonate and water, then dried over sodium sulfate, and concentrated in vacuo. The residue is then chromatographed on a silica gel column and eluted with ether-petroleum ether (10–100%) to give 2-(3-chloro-4-cyclohexylphenyl)-1-propanol.

When

α-methyl-3-bromo-4-cyclohexylphenyl acetic acid,

α-methyl-3-chloro-4-cyclopentylphenyl acetic acid,
α-methyl-3-chloro-4-secondarybutylphenyl acetic acid,
α-methyl-4-cyclohexyl-2,5-dichlorophenyl acetic acid,
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-methylthiophenyl acetic acid,
α-methyl-4-cyclohexyl-3-methoxyphenyl acetic acid,
α-methyl-4-cyclohexyl-3-dimethylaminophenyl acetic acid, and
α-methyl-3-substituted, 2-, 5- and 6-substituted-4-cyclohexylphenyl acetic acid,
α-methyl-2-, 5- and 6-amino acetic acid,
α-methyl 2-, 5- and 6-hydroxy acetic acid and α-methyl-2-, 5- and 6-fluoro acetic acid compounds obtained from Example 30 (except those compounds containing a nitro group) are used in place of α-methyl-3-chloro-4-cyclohexylphenyl acetic acid in the above example, there are obtained 2-(3-bromo-4-cyclohexyl-phenyl)-1-propanol,
2-(3-chloro-4-cyclopentylphenyl)-1-propanol,
2-(3-chloro-4-secondarybutylphenyl)-1-propanol,
2-(4-cyclohexyl-2,5-dichlorophenyl)-1-propanol,
2-(2-bromo-5-chloro-4-cyclohexylphenyl)-1-propanol,
2-(5-bromo-2-chloro-4-cyclohexylphenyl)-1-propanol,
2-(4-cyclohexyl-5-trifluoromethylphenyl)-1-propanol,
2-(4-cyclohexyl-2,3-dichlorophenyl)-1-propanol,
2-(4-cyclohexyl-3,5-dichlorophenyl)-1-propanol,
2-(3-chloro-4-cyclohexylphenyl)-1-butanol,
2-(4-cyclohexyl-5-trifluoromethylphenyl)-1-butanol,
2-(4-cyclohexyl-3-methyl-thiophenyl)-1-propanol,
2-(4-cyclohexyl-3-methoxyphenyl)-1-propanol,
2-(4-cyclohexyl-3-dimethylaminophenyl)-1-propanol, and
2-(3-substituted, 2-, 5- and 6-substituted-4-cyclohexylphenyl)-1-propanol,
1-(2-, 5- and 6-amino)-1-propanol,
2-(2, 5- and 6-amino)-1-propanol and
2-(2-, 5- and 6-fluoro)-1-propanol compounds, respectively.

EXAMPLE 42

Methyl-2-(3-chloro-4-cyclohexylphenyl)-1-propyl ether

To a well-stirred suspension of 0.01 mole of sodium hydride in 25 cc. of dry dimethylformamide which has been cooled to 0° C. is added dropwise a solution of 0.01 mole of 2-(3-chloro-4-cyclohexylphenyl)-1-propanol in 10 cc. dimethylformamide. The reaction mixture is stirred for 15 minutes and 0.015 mole of methyl iodide is then added dropwise. The mixture is allowed to stir overnight at room temperature. 200 ml. of water is added and the resulting mixture extracted well with ether. The combined ether extracts are washed with water, dried over sodium sulfate, and concentrated. The residue is chromatographed on 250 grams of silica gel and eluted with ether-petroleum ether (10–80%) to yield methyl-2-(3-chloro-4-cyclohexylphenyl)-1-propyl ether.

When ethyl iodide, allyl bromide, benzyl chloride, and ethoxyethyl chloride are used in place of methyl iodide in the above example, there are obtained ethyl-2-(3-chloro-4 - cyclohexylphenyl) - 1-propyl ether, allyl-2-(3-chloro-4 - cyclohexylphenyl) - 1-propyl ether, benzyl-2-(3-chloro-4-cyclohexylphenyl)-1-propyl ether, and ethoxyethyl-2-(3-chloro-4-cyclohexylphenyl)-1-propyl ether respectively.

When 2-(3-bromo-4-cyclohexylphenyl)-1-propanol,
2-(3-chloro-4-cyclopentylphenyl)-1-propanol,
2-(3-chloro-4-secondarybutylphenyl)-1-propanol,
2-(4-cyclohexyl-2,5-dichlorophenyl)-1-propanol,
2-(2-bromo-5-chloro-4-cyclohexylphenyl)-1-propanol,
2-(5-bromo-2-chloro-4-cyclohexylphenyl)-1-propanol,
2-(4-cyclohexyl-5-trifluoromethylphenyl)-1-propanol,
2-(4-cyclohexyl-2,3-dichlorophenyl)-1-propanol,
2-(4-cyclohexyl-3,5-dichlorophenyl)-1-propanol,
2-(3-chloro-4-cyclohexylphenyl)-1-butanol,
2-(4-cyclohexyl-5-trifluoromethylphenyl)-1-butanol,
2-(4-cyclohexyl-3-methylthiophenyl)-1-propanol,
2-(4-cyclohexyl-3-methoxyphenyl)-1-propanol,
2-(4-cyclohexyl-3-dimethylaminophenyl)-1-propanol,
2-(3-substituted-2-, 5- and 6-substituted-4-cyclohexylphenyl)-1-propanol,
2-(2-, 5- and 6-amino)-1-propanol,
2-(2-, 5- and 6-hydroxy)-1-propanol and 2-(2-, 5- and 6-fluoro)-1-propanol compounds obtained from Example 41 are used in place of 2-(3-chloro-4 cyclohexylphenyl)-1-propanol in the above example, there are obtained methyl-2-(3-bromo-4-cyclohexylphenyl)-1-propyl ether,
methyl-2-(3-chloro-4-cyclopentylphenyl)-1-propyl ether,
methyl-2-(3-chloro-4-secondarybutylphenyl)-1-propyl ether,
methyl-2-(4-cyclohexyl-2,5-dichlorophenyl)-1-propyl ether,
methyl-2-(2-bromo-5-chloro-4-cyclohexylphenyl)-1-propyl ether,
methyl-2-(5-bromo-2-chloro-4-cyclohexylphenyl)-1-propyl ether,
methyl-2-(4-cyclohexyl-5-trifluoromethylphenyl)-1-propyl ether,
methyl-2-(4-cyclohexyl-2,3-dichlorophenyl)-1-propyl ether,
methyl-2-(4-cyclohexyl-3,5-dichlorophenyl)-1-propyl ether,
methyl-2-(3-chloro-4-cyclohexylphenyl)-1-butyl ether,
methyl-2-(4-cyclohexyl-5-trifluoromethylphenyl)-1-butyl ether,
methyl-2-(4-cyclohexyl-3methylthiophenyl)-1-propyl ether,
methyl-2-(4-cyclohexyl-3-methoxyphenyl)-1-propyl ether,
methyl-2-(4-cyclohexyl-3-dimethylaminophenyl)-1-propyl ether,
methyl-2-(3-substituted, 2-, 5- and 6-substituted-4-cyclohexylphenyl)-1-propyl ether,
methyl-2-(2-, 5- and 6-amino)-1-propyl ether,
methyl-2-(2-, 5- and 6-hydroxy)-1-propyl ether and methyl-2-(2-, 5- and 6-fluoro)-1-propyl ether, respectively.

EXAMPLE 43

α-Methyl-3-chloro-4-cyclohexylphenyl acetaldehyde (A) α-Methyl-3-chloro-4-cyclohexylphenyl acetyl chloride.—To a solution of 0.01 mole of α-methyl-3-chloro-4-cyclohexylphenyl acetic acid in 50 cc. of benzene is added 0.011 mole of thionyl chloride. The solution is heated on the steam bath for 1 hour and then concentrated in vacuo to remove the solvent and any excess thionyl chloride. 25 ml. of benzene is then added and removed in vacuo to yield α-methyl-3-chloro-4-cyclohexylphenyl acetyl chloride.

(B) α-Methyl-3-chloro - 4 - cyclohexylphenyl acetaldehyde.—To a suspension of 0.01 mole tritertiarybutoxy lithium aluminum hydride in 50 cc. dry tetrahydrofuran is added dropwise with stirring a solution of 0.01 mole of α-methyl-3-chloro-4-cyclohexylphenyl acetyl chloride in 25 cc. dry tetrahydrofuran. The reaction mixture is stirred at −10° C. for 3 hours followed by the addition of 200 cc. of 5% sulfuric acid added cautiously, and the resultant mixture extracted well with (3× 75 ml.) ether. The combined ether extracts are washed with water, dried over sodium sulfate, and concentrated. The residue is chromatographed on 250 grams of silica gel and eluted with 10–90% ether-petroleum ether to yield α-methyl-3-chloro-4-cyclohexylphenyl acetaldehyde.

When
α-methyl-3-bromo-4-cyclohexylphenyl acetic acid,
α-methyl-3-chloro-4-cyclopentylphenyl acetic acid,
α-methyl-3-chloro-4-secondarybutyphenyl acetic acid,
α-methyl-4-cyclohexyl-2,5-dichlorophenyl acetic acid,
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-nitrophenyl acetic acid,
α-methyl-5-chloro-4-cyclohexyl-2-nitrophenyl acetic acid,
α-methyl-2-amino-5-chloro-4-cyclohexylphenyl acetic acid,
α-methyl-4-cyclohexyl-3-methylsulfonylphenyl acetic acid,
and α-methyl-3-substituted, 2-, 5- and 6-substituted-4-cyclo-hexylphenyl acetic acid compounds, α-methyl-2-, 5- and 6-amino acetic acid compounds, α-methyl-2-, 5- and 6-hydroxy acetic acid compounds and α-methyl-2-, 5- and 6-fluoro acetic acid compounds
obtained from Example 30 (except those compounds containing a nitro group) are used in place of α-methyl-3-chloro-4-cyclohexylphenyl acetic acid in Part A of the above example and the product thereof used in Part B of the above example, there are obtained
α-methyl-3-bromo-4-cyclohexylphenyl acetaldehyde,
α-methyl-3-chloro-4-cyclo-pentylphenyl acetaldehyde,
α-methyl-3-chloro-4-secondary-butylphenyl acetaldehyde,
α-methyl-4-cyclohexyl-2,5-dichlorophenyl acetaldehyde,
α-methyl-2-bromo-5-chloro-4-cyclohexyl-phenyl acetaldehyde,
α-methyl-5-bromo-2-chloro-4-cylclohexyl-phenyl acetaldehyde,
α-methyl-4-cyclohexyl-5-trifluoromethyl-phenyl acetaldehyde,
α-methyl-4-cyclohexyl-2,3-dichlorophenyl acetaldehyde,
α-methyl-4-cyclohexyl-3,5-dichlorophenyl acetaldehyde,
α-ethyl-3-chloro-4-cyclohexylphenyl acetaldehyde,
α-ethyl-4-cyclohexyl-5-trifluoromethylphenyl acetaldehyde,
α-methyl-4-cyclohexyl-3-nitrophenyl acetaldehyde,
α-methyl-5-chloro-4-cyclohexyl-2-nitrophenyl acetaldehyde,
α-methyl-2-amino-5-chloro-4-cyclohexylpehnyl acetaldehyde,
α-methyl-4-cyclohexyl-3-methylsulfonylphenyl acetaldehyde,
and α-methyl-3-substituted, 2-, 5- and 6-substituted-4-cyclohexylphenyl acetaldehyde compounds, α-methyl-2-, 5- and 6-amino acetaldehyde compounds, α-methyl-2-, 5- and 6-hydroxy acetaldehyde compounds and α-methyl-2-, 5- and 6-fluoro acetaldehyde compounds (except those compounds containing a nitro group) respectively.

EXAMPLE 44

α-Methyl-3-chloro-4-cyclohexylphenyl acetaldehyde dimethyl acetal

To a solution of 0.01 mole of α-methyl-3-chloro-4-cyclo-hexylphenyl acetaledhyde in 100 cc. of anhydrous methanol is added 0.001 mole of p-toluenesulfonic acid. The reaction mixture is stirred at room temperature for 5 days. A solution of sodium methoxide in methanol is added until the solution is just alkaline to moistened litmus paper. The methanol is removed in vacuo and the residue taken up in ether and washed well with water. The solution is dried over sodium sulfate and concentrated. The residue is chromatographed on neutral alumina. Elution with ether-petroleum ether (10–90%) gives the dimethyl acetal of α-methyl-3-chloro-4-cyclohexylphenyl acetaldehyde.

When ethanol, n-propanol, and n-butanol are used in place of methanol in the above example, there are obtained the corresponding diethyl, dipropyl, and dibutyl acetals.

When
α-methyl-3-bromo-4-cyclohexylphenyl acetaldehyde,
α-methyl-3-chloro-4-cyclopentylphenyl acetaldehyde,
α-methyl-3-chloro-4-secondarybutylphenyl acetaldehyde,
α-methyl-4-cyclohexyl-2,5-dichlorophenyl acetaldehyde,
α-methyl-2-bromo-5-chloro-4-cyclohexylphenyl acetaldehyde,
α-methyl-5-bromo-2-chloro-4-cyclohexylphenyl acetaldehyde,
α-methyl-4-cyclohexyl-5-trifluoromethylphenyl acetaldehyde,
α-methyl-4-cyclohexyl-2,3-dichlorophenyl acetaldehyde,
α-methyl-4-cyclohexyl-3,5-dichlorophenyl acetaldehyde,
α-ethyl-3-chloro-4-cyclohexylphenyl acetaldehyde,
α-ethyl-4-cyclohexyl-5-trifluoromethylphenyl acetaldehyde,
α-methyl-4-cyclohexyl-3-nitrophenyl acetaldehyde,
α-methyl-5-chloro-4-cyclohexyl-2-nitrophenyl acetaldehyde,
α-methyl-2-amino-5-chloro-4-cyclohexylphenyl acetaldehyde,
α-methyl-4-cyclohexyl-3-methylsulfonylphenyl acetaldehyde, and
α-methyl-3-substituted, 2-, 5- and 6-substituted-4-cyclohexylphenyl acetaldehyde,
α-methyl-2-, 5- and 6-amino acetaldehyde,
α-methyl-2-, 5- and 6-hydroxy acetaldehyde and
α-methyl-2-, 5- and 6-fluoro acetadehyde compounds obtained from Example 43 are used in place of
α-methyl-3-chloro-4-cyclohexylphenyl acetaldehyde in the above example, there are obtained
α-methyl-3-bromo-4-cyclohexylphenyl acetaldehyde dimethyl acetal,
α-methyl-3-chloro-4-cyclopentylphenyl acetaldehyde dimethyl acetal,
α-methyl-3-chloro-4-secondarybutylphenyl acetaldehyde dimethyl acetal,
α-methyl-4-cyclohexyl-2,5-dichlorophenyl acetaldehyde dimethyl acetal,
α-methyl-2-bromo-5-chloro-4-cyclohexylphenyl acetaldehyde dimethyl acetal,
α-methyl-5-bromo-2-chloro-4-cyclohexylphenyl acetaldehyde dimethyl acetal,
α-methyl-4-cyclohexyl-5-trifluoromethylphenyl acetaldehyde dimethyl acetal,
α-methyl-4-cyclohexyl-2,3-dichlorophenyl acetaldehyde dimethyl acetal,
α-methyl-4-cyclohexyl-3,5-dichlorophenyl acetaldehyde dimethyl acetal,
α-ethyl-3-chloro-4-cyclohexylphenyl acetaldehyde dimethyl acetal,
α-ethyl-4-cyclohexyl-5-trifluoromethylphenyl acetaldehyde dimethyl acetal,
α-methyl-4-cyclohexyl-3-nitrophenyl acetaldehyde dimethyl acetal,
α-methyl-5-chloro-4-cyclohexyl-2-nitrophenyl acetaldehyde dimethyl acetal,
α-methyl-2-amino-5-chloro-4-cyclohexylphenyl acetaldehyde dimethyl acetal,
α-methyl-4-cyclohexyl-3-methylsulfonylphenyl acetaldehyde dimethyl acetal,
α-methyl-3-substituted, 2-, 5- and 6-substituted-4-cyclohexylphenyl acetaldehyde dimethyl acetal,
α-methyl-2-, 5-, and 6-amino acetaldehyde dimethyl acetal, α-methyl-2, 5- and 6-hydroxy acetaldehyde dimethyl acetal and
α-methyl-2-, 5- and 6-fluoro acetaldehyde dimethyl acetal compounds, respectively.

EXAMPLE 45

α-Methyl-3-chloro-4-cyclohexylphenyl acetamide 0.05 mole of α-methyl-3-chloro-4-cyclohexylphenyl acetic acid is slowly treated with 0.2 mole of thionyl chloride. The resultant mixture is heated gently on a steam bath for 2 hours and the excess thionyl chloride is removed in vacuo. To this concentrated material is added 40 ml. of 1,2-dimethoxyethane and the solution is then added dropwise to 100 ml. of stirred commercial ammonium hydroxide solution (approximately 30%) with ice-cooling. The α-methyl-3-chloro-4-cyclohexylphenyl acetamide is collected, washed with water, and dried in vacuo.

When methylamine, ethanolamine, propylamine, 2,3-dihydroxybutylamine, benzylamine, aniline, o-methoxy aniline, p-ethoxy aniline, m-trifluoromethyl aniline, cyclohexylamine, carbobenzyloxymethylamine, carboxymethylamine, glutamine, aminomethyl pyrrolidine, 3-aminomethyl-1-ethyl pyrrolidine, morpholine, piperazine, piperidine, and pyrrolidine are used in the above example in place of ammonium hydroxide, there are obtained the corresponding α-methyl-3-chloro-4-cyclohexylphenyl-substituted amides.

When

α-methyl-3-bromo-4-cyclohexylphenyl acetic acid,
α-methyl-3-chloro-4-cyclopentylphenyl acetic acid,
α-methyl-3-chloro-4-secondarybutylphenyl acetic acid,
α-methyl-4-cyclohexyl-2,5-dichlorophenyl acetic acid,
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-nitrophenyl acetic acid,
α-methyl-5-chloro-4-cyclohexyl-2-nitrophenyl acetic acid,
α-methyl-3-amino-4-cyclohexylphenyl acetic acid,
α-methyl-2-amino-5-chloro-4-cyclohexylphenyl acetic acid,
α-methyl-4-cyclohexyl-3-methylthiophenyl acetic acid,
α-methyl-4-cyclohexyl-3-methoxyphenyl acetic acid,
α-methyl-3-substituted, 2-, 5- and 6-substituted-4-cyclohexylphenyl acetic acid compounds,
α-methyl-2-, 5- and 6-amino acetic acid compounds,
α-methyl-2-, 5- and 6-hydroxy acetic acid compounds, and
α-methyl-2-, 5- and 6-fluoro acetic acid compounds obtained from Example 30 are used in place of α-methyl-3-chloro-4-cyclohexylphenyl acetic acid in the above example, there are obtained α-methyl-3-bromo-4-cyclohexylphenyl acetamide,
α-methyl-3-chloro-4-cyclopentylphenyl acetamide,
α-methyl-3-chloro-4-secondarybutylphenyl acetamide,
α-methyl-4-cyclohexyl-2,5-dichlorophenyl acetamide,
α-methyl-2-bromo-5-chloro-4-cyclohexylphenyl acetamide,
α-methyl-5-bromo-2-chloro-4-cyclohexylphenyl acetamide,
α-methyl-4-cyclohexyl-5-trifluoromethylphenyl acetamide,
α-methyl-4-cyclohexyl-2,3-dichlorophenyl acetamide,
α-methyl-4-cyclohexyl-3,5-dichlorophenyl acetamide,
α-ethyl-3-chloro-4-cyclohexylphenyl acetamide,
α-ethyl-4-cyclohexyl-5-trifluoromethylphenyl acetamide,
α-methyl-4-cyclohexyl-3-nitrophenyl acetamide,
α-methyl-5-chloro-4-cyclohexyl-2-nitrophenyl acetamide,
α-methyl-3-amino-4-cyclohexylphenyl acetamide,
α-methyl-2-amino-5-chloro-4-cyclohexylphenyl acetamide,
α-methyl-4-cyclohexyl-3-methylthiophenyl acetamide,
α-methyl-4-cyclohexyl-3-methoxyphenyl acetamide;
α-methyl-3-substituted, 2-, 5- and 6-substituted-4-cyclohexylphenyl acetamide,
α-methyl-2-, 5- and 6-amino acetamide,
α-methyl-2, 5- and 6-hydroxy acetamide and
α-methyl-2-, 5- and 6-fluoro acetamide compounds, respectively (when the compound has a hydroxy group first forming the benzylated hydroxy, and subsequent reduction back to the hydroxy).

EXAMPLE 46

α-Methyl-3-chloro-4-cyclohexylphenyl acetamide

To a solution of 0.01 mole of α-methyl-3-chloro-4-cyclohexylphenyl acetic acid in 40 ml. of 1,2-dimethoxy ethane is added 0.01 mole of triethylamine. The resulting mixture is ice-cooled, stirred, and 0.01 mole of i-butyl chloroformate is added. Stirring is then continued in the cold for an additional 30 minutes. The triethylamine hydrochloride is then removed by filtration and the filtrate cooled again. Dry dimethoxyethane saturated with dry ammonia gas is then added and the ammonia gas bubbled through the resultant mixture for approximately one minute. The mixture is then stirred at about 5° C. for 16 hours. The solvent is removed in vacuo and the residue is crystallized from ethanol-water to yield α-methyl-3-chloro-4-cyclohexylphenyl acetamide.

When methylamine, ethanolamine, propylamine, 2,3-dihydroxybutylamine, benzylamine, aniline, o-methoxy aniline, p-ethoxy aniline, m-trifluoromethyl aniline, cyclohexylamine, carbobenzyloxymethylamine, carboxymethylamine, glutamine, aminomethyl pyrrolidine, 3-aminomethyl-1-ethyl pyrrolidine, morpholine, piperazine, piperidine and pyrrolidine are used in the above example in place of ammonia gas, there are obtained the corresponding α-methyl - 3 - chloro-4-cyclohexylphenyl-substituted amides.

When α-methyl - 3 - bromo-4-cyclohexylphenyl acetic acid,
α-methyl-3-chloro-4-cyclopentylphenyl acetic acid,
α-methyl-3-chloro-4-secondarybutylphenyl acetic acid,
α-methyl-4-cyclohexyl-2,5-dichlorophenyl acetic acid,
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-nitrophenyl acetic acid,
α-methyl-5-chloro-4-cyclohexyl-2-nitrophenyl acetic acid,
α-methyl-3-amino-4-cyclohexylphenyl acetic acid,
α-methyl-2-amino-5-chloro-4-cyclohexylphenyl acetic acid,
α-methyl-4-cyclohexyl-3-methylthiophenyl acetic acid,
α-methyl-4-cyclohexyl-3-methoxyphenyl acetic acid,
α-methyl-4-cyclohexyl-3-methylsulfonylphenyl acetic acid,
α-methyl-4-cyclohexyl-3-dimethylsulfamylphenyl acetic acid,
α-methyl-3-cyano-4-cyclohexylphenyl acetic acid,
and α-methyl-3-acetylamino-4-cyclohexylphenyl acetic acid are used in place of α-methyl-3-chloro-4-cyclohexylphenyl acetic acid in the above example, there are obtained α-methyl-3-bromo-4-cyclohexylphenyl acetamide, α-methyl-3-chloro-4-cyclopentylphenyl acetamide,
α-methyl-3-chloro-4-secondarybutylphenyl acetamide,
α-methyl-4-cyclohexyl-2,5-dichlorophenyl acetamide,
α-methyl-2-bromo-5-chloro-4-cyclohexylphenyl acetamide,
α-methyl-5-bromo-2-chloro-4-cyclohexylphenyl acetamide,
α-methyl-4-cyclohexyl-5-trifluoromethylphenyl acetamide,
α-methyl-4-cyclohexyl-2,3-dichlorophenyl acetamide,
α-methyl-4-cyclohexyl-3,5-dichlorophenyl acetamide,
α-ethyl-3-chloro-4-cyclohexylphenyl acetamide,
α-ethyl-4-cyclohexyl-5-trifluoromethylphenyl acetamide,
α-methyl-4-cyclohexyl-3-nitrophenyl acetamide,
α-methyl-5-chloro-4-cyclohexyl-2-nitrophenyl acetamide,
α-methyl-3-amino-4-cyclohexylphenyl acetamide,
α-methyl-2-amino-5-chloro-4-cyclohexylphenyl acetamide,
α-methyl-4-cyclohexyl-3-methylthiophenyl acetamide,
α-methyl-4-cyclohexyl-3-methoxyphenyl acetamide,
α-methyl-4-cyclohexyl-3-methylsulfonylphenyl acetamide,
α-methyl-4-cyclohexyl-3-dimethylsulfamylphenyl acetamide,
α-methyl-3-cyano-4-cyclohexylphenyl acetamide,
and α-methyl-3-acetylamine-4-cyclohexylphenyl acetamide respectively.

EXAMPLE 47

Methyl α-methyl-3-chloro-4-cyclohexylphenyl acetate

A mixture of 0.05 mole of α-methyl-3-chloro-4-cyclohexylphenyl acetic acid, 6 ml. of concentrated sulfuric acid, and 200 ml. of anhydrous methonol (ca. 3% sulfuric acid) is stirred at room temperature overnight. The solution is then concentrated in vacuo to approximately ⅓ the volume. 200 ml. of water are added and the mixture extracted with (3× 75 ml.) ether. The combined ether extracts are then washed with saturated potassium bicarbonate solution and water. The ether solution is then dried over magnesium sulfate, filtered, and concentrated to a residue. The residue is then chromatographed on a silica gel column (wt./wt. 50:1 gram crude) using an ether-petroleum ether system (v./v. 20–60%) as eluent to yield methyl α-methyl-3-chloro-4-cyclohexylphenyl acetate.

When a solution of gaseous hydrochloric acid in methanol is used in place of the sulfuric acid-methanol solution in the above example, there is obtained methyl α-methyl-3-chloro-4-cyclohexylphenyl acetate.

When ethanol, n-propanol, and i-butanol are used in place of methanol in the above example, there are obtained the corresponding ethyl, n-propyl, and i-butyl esters of α-methyl-3-chloro-4-cyclohexylphenyl acetic acid.

When

α-methyl-3-bromo-4-cyclohexylphenyl acetic acid,
α-methyl-3-chloro-4-cyclopentylphenyl acetic acid,
α-methyl-3-chloro-4-secondarybutylphenyl acetic acid,
α-methyl-4-cyclohexyl-2,5-dichlorophenyl acetic acid,
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-nitrophenyl acetic acid,
α-methyl-5-chloro-4-cyclohexyl-2-nitrophenyl acetic acid,
α-methyl-3-amino-4-cyclohexylphenyl acetic acid,
α-methyl-2-amino-5-chloro-4-cyclohexylphenyl acetic acid,
α-methyl-4-cyclohexyl-3-methoxyphenyl acetic acid,
α-methyl-4-cyclohexyl-3-hydroxyphenyl acetic acid,
α-methyl-4-cyclohexyl-3-nitrophenyl acetic acid, and α-methyl-3-substitued, 2-, 5- and 6-substituted-4-cyclohexylphenyl acetic acid compounds,
α-methyl-2-, 5- and 6-amino acetic acid compounds,
α-methyl-2-, 5- and 6-hydroxy acetic acid compounds and
α-methyl-2-, 5- and 6-fluoro acetic acid compounds obtained from Example 30 are used in place of α-methyl-3-chloro-4-cyclohexylphenyl acetic acid in the above example, there are obtained methyl α-methyl-3-bromo-4-cyclopentylphenyl acetate,
methyl α-methyl-3-chloro-4-cyclopentylphenyl acetate,
methyl α-methyl-3-chloro-4-secondarybutylphenyl acetate,
methyl α-methyl-4-cyclohexyl-2,5-dichlorophenyl acetate,
methyl α-methyl-2-bromo-5-chloro-4-cyclohexylphenyl acetate,
methyl α-methyl-5-bromo-2-chloro-4-cyclohexylphenyl acetate,
methyl α-methyl-4-cyclohexyl-5-trifluoromethylphenyl acetate,
methyl α-methyl-4-cyclohexyl-2,3-dichlorophenyl acetate,
methyl α-methyl-4-cyclohexyl-3,5-dichlorophenyl acetate,
methyl α-ethyl-3-chloro-4-cyclohexylphenyl acetate,
methyl α-ethyl-4-cyclohexyl-5-trifluoromethylphenyl acetate,
methyl α-methyl-4-cyclohexyl-3-nitrophenyl acetate,
methyl α-methyl-4-cyclohexyl-3-nitrophenyl acetate,
methyl α-methyl-5-chloro-4-cyclohexyl-2-nitrophenyl acetate,
methyl α-methyl-3-amino-4-cyclohexylphenyl acetate,
methyl α-methyl-2-amino-5-chloro-4-cyclohexylphenyl acetate,
methyl α-methyl-4-cyclohexyl-3-methoxyphenyl acetate,
methyl α-methyl-4-cyclohexyl-4-hydroxyphenyl acetate,
methyl α-methyl-4-cyclohexyl-3-nitrophenyl acetate, methyl-α-methyl-3-substituted, 2-, 5-, and 6-substituted-4-cyclohexylphenyl acetate compounds,
methyl-α-methyl-2-, 5- and 6-amino acetate compounds,
methyl-α-methyl-2-, 5- and 6-hydroxy acetate compounds and methyl-α-methyl-2, 5- and 6-fluoro acetate compounds respectively.

EXAMPLE 48 t-Butyl α-methyl-3-chloro-4-cyclohexylphenyl acetate 0.05 mole of α-methyl-3-chloro-4-cyclohexylphenyl acetic acid is treated with 0.2 mole of thionyl chloride and the resultant mixture gently heated on a steam bath for 2 hours. The excess thionyl chloride is then removed in vacuo. 50 ml. of benzene is added and the solvent again removed in vacuo. 50 ml. of fresh dry 1,2-dimethoxyethane is then added and the resultant solution slowly added to a mixture of 0.06 mole of potassium tertiary butoxide in 100 ml. dimethoxyethane with ice-cooling. The resultant mixture is then stirred at room temperature for 4 hours and then concentrated to a residue in vacuo. The residue is then dissolved in ether, washed with sodium bicarbonate, dried, evaporated, and chromatographed on a silica gel column (wt./wt. 50:1 gram crude) using an ether-petroleum ether (v./v. 20–60%) system as eluent to yield t-butyl α-methyl-3-chloro-4-cyclohexylphenyl acetate.

When the sodium or potassium alkoxides of ethanol, n-propanol, i-butanol, benzyl alcohol, phenol, and phenylethanol are used in place of potassium tertiary butoxide in the above example, there are obtained the corresponding ethyl, n-propyl, i-butyl, benzyl, phenyl, and phenylethyl esters of α-methyl-3-chloro-4-cyclohexylphenyl acetic acid respectively.

When

α-methyl-3-bromo-4-cyclohexylphenyl acetic acid,
α-methyl-3-chloro-4-cyclopentylphenyl acetic acid, α-methyl-3-chloro-4-secondarybutylphenyl acetic acid,
α-methyl-4-cyclohexyl-2,5-dichlorophenyl acetic acid,
α-methyl-2-bromo-5-chloro-4-cyclohexylphenyl acetic acid,
α-methyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-nitrophenyl acetic acid,
α-methyl-5-chloro-4-cyclohexyl-2-nitrophenyl acetic acid,
α-methyl-3-amino-4-cyclohexylphenyl acetic acid,
α-methyl-2-amino-5-chloro-4-cyclohexylphenyl acetic acid,
α-methyl-4-cyclohexyl-3-methoxyphenyl acetic acid, and
α-methyl-4-cyclohexyl-3-nitrophenyl acetic acid are used in place of α-methyl-3-chloro-4-cyclohexylphenyl acetic acid in the above example, there are obtained methyl α-methyl-3-bromo-4-cyclohexylphenyl acetate,
methyl α-methyl-3-chloro-4-cyclopentylphenyl acetate,
methyl α-methyl-3-chloro-4-secondarybutylphenyl acetate,
methyl α-methyl-4-cyclohexyl-2,5-dichlorophenyl acetate,
methyl α-methyl-2-bromo-5-chloro-4-cyclohexylphenyl acetate,
methyl α-methyl-5-bromo-2-chloro-4-cyclohexylphenyl acetate,
methyl α-methyl-4-cyclohexyl-5-trifluoromethylphenyl acetate,
methyl α-methyl-4-cyclohexyl-2,3-dichlorophenyl acetate,
methyl α-methyl-4-cyclohexyl-3,5-dichlorophenyl acetate,
methyl α-ethyl-3-chloro-4-cyclohexylphenyl acetate,
methyl α-ethyl-4-cyclohexyl-5-trifluoromethylphenyl acetate,
methyl α-methyl-4-cyclohexyl-3-nitrophenyl acetate,
methyl α-methyl-5-chloro-4-cyclohexyl-2-nitrophenyl acetate,
mehtyl α-methyl-3-amino-4-cyclohexylphenyl acetate,
methyl α-methyl-2-amino-5-chloro-4-cyclohexylphenyl acetate,
methyl α-methyl-4-cyclohexyl-3-methoxyphenyl acetate,
and methyl α-methyl-4-cyclohexyl-3-nitrophenyl acetate respectively.

EXAMPLE 49

Methyl α-methyl-3-chloro-4-cyclohexyl-phenyl acetate

To a solution of 0.01 mole of α-methyl-3-chloro-4-cyclohexylphenyl acetic acid in 30 ml. of anhydrous tetrahydrofuran is added 0.011 mole of methanol followed by 0.001 mole of N,N-dicyclohexylcarbodiimide (which has been dissolved in a minimum amount of tetrahydrofuran). The mixture is then shaken thoroughly for a minute and allowed to sit overnight stoppered. The mixture is then filtered, the precipitated N,N-dicyclohexylurea obtained is washed with a small portion of fresh tetrahydrofuran, and the wash combined with the filtrate. The combined filtrates are concentrated to dryness. The residue is then taken up in 100 ml. of ether, washed with bicarbonate solution, water, dried over magnesium sulfate, filtered, and concentrated to a residue. The residue is then chromatographed on a silica gel column (wt./wt.. 50:1 gram crude) using an ether-petroleum ether (v./v. 20–60%) system as eluent to yield α-methyl-3-chloro-4-cyclohexylphenyl acetate.

When ethanol, n-propanol, i-butanol, benzyl alcohol, phenylethanol, N,N-diethylethanolamine, and N,N-dimethylethanolamine are used in place of methanol in the above example, there are obtained the ethyl, n-propyl, i-butyl, benzyl, phenylethyl, N,N-diethylaminoethyl, and N,N-dimethylaminoethyl esters of α-methyl-3-chloro-4-cyclohexylphenyl acetic acid respectively. The esters from the N-substituted ethanolamines are extracted from the ether solution indicated in the above example using dilute hydrochloric acid, the acid solution washed well with ether, made slightly alkaline with ammonium hydroxide, extracted with ether, the combined ether extracts washed with water, dried over potassium carbonate and charcoal, filtered, and the resulting ether solution concentrated to a residue. The volatile ethanolamines are then removed in vacuo.

When

α-methyl-3-bromo-4-cyclohexylphenyl acetic acid,
α-methyl-3-chloro-4-cyclopentylphenyl acetic acid,
α-methyl-3-chloro-4-secondarybutylphenyl acetic acid,
α-methyl-4-cyclohexyl-2,5-dichlorophenyl acetic acid,
α-methyl-2-bromo-5-chloro-4-cyclohexylphenyl acetic acid,
α-metyl-5-bromo-2-chloro-4-cyclohexylphenyl acetic acid,
α-methyl-4-cyclohexyl-5-trifluoromethylphenyl acetic acid,
α-methyl-4-cyclohexyl-2,3-dichlorophenyl acetic acid,
α-methyl-4-cyclohexyl-3,5-dichlorophenyl acetic acid,
α-ethyl-3-chloro-4-cyclohexylphenyl acetic acid,
α-ethyl-4-cyclohexyl-5-trifluoromethylphenyl acetic acid,
α-methyl-4-cyclohexyl-3-nitrophenyl acetic acid,
α-methyl-5-chloro-4-cyclohexyl-2-nitrophenyl acetic acid,
α-methyl-3-amino-4-cyclohexylphenyl acetic acid,
α-methyl-2-amino-5-chloro-4-cyclohexylphenyl acetic acid,
α-methyl-4-cyclohexyl-3-methoxyphenyl acetic acid,
α-methyl-4-cyclohexyl-3-nitrophenyl acetic acid,
α-methyl-3-cyano-4-cyclohexylphenyl acetic acid,
α-methyl-3-acetylamino-4-cyclohexylphenyl acetic acid,
α-methyl-4-cyclohexyl-3-dimethylaminophenyl acetic acid,
α-methyl-4-cyclohexyl-3-methylsulfonylphenyl acetic acid, and
α-methyl-4-cyclohexyl-3-dimethylsulfamylphenyl acetic acid are used in place of α-methyl-3-chloro-4-cyclohexylphenylacetic acid in the above example, there are obtained methyl α-methyl-3-bromo-4-cyclohexylphenyl acetate,
methyl-α-methyl-3-chloro-4-cyclophenylphenyl acetate,
methyl α-methyl-3-chloro-4-secondarybutylphenyl acetate,
methyl α-methyl-4-cyclohexyl-2,5-dichlorophenyl acetate,
methyl α-methyl-2-bromo-5-chloro-4-cyclohexylphenyl acetate,
methyl α-methyl-5-bromo-2-chloro-4-cyclohexylphenyl acetate,
methyl α-methyl-4-cyclohexyl-5-trifluoromethylphenyl acetate,
methyl α-methyl-4-cyclohexyl-2,3-dichlorophenyl acetate,
methyl α-methyl-4-cyclohexyl-3,5-dichlorophenyl acetate,
methyl α-ethyl-3-chloro-4-cyclohexylphenyl acetate,
methyl α-ethyl-4-cyclohexyl-5-trifluoromethylphenyl acetate,
methyl α-methyl-4-cyclohexyl-3-nitrophenyl acetate,
methyl α-methyl-5-chloro-4-cyclohexyl-2-nitrophenyl acetate,
methyl α-methyl-3-amino-4-cyclohexylphenyl acetate,
methyl α-methyl-2-amino-5-chloro-4-cyclohexylphenyl acetate,
methyl α-methyl-4-cyclohexyl-3-methoxyphenyl acetate
methyl α-methyl-4-cyclohexyl-3-nitrophenyl acetate,
methyl α-methyl-3-cyano-4-cyclohexylphenyl acetate,
methyl α-methyl-3-acetylamino-4-cyclohexylphenyl acetate,
methyl α-methyl-4-cyclohexyl-3-dimethylaminophenyl acetate,
methyl α-methyl-4-cyclohexyl-3-methylsulfonylphenyl acetate, and
methyl α-methyl-4-cyclohexyl-3-dimethylsulfamylphenyl acetate respectively.

EXAMPLE 50 d α-methyl-3-chloro-4-cyclohexylphenyl acetic acid

To a solution of 12.67 grams (0.042 mole) of cinchonidine in hot chloroform is added a solution of 20.9 grams of α-methyl-3-chloro-4-cyclohexylphenyl acetic acid (0.0783 mole) (55% of base) in 100 cc. chloroform. An exothermic reaction takes place. After 30 minutes, the solution is concentrated in vacuo to remove all chloroform. The resulting oil crystallizes upon the gradual addition of acetone. The salt is then resolved by dissolving it in boiling acetone, distilling the solvent at atmospheric pressure until crystals begin to appear. The solution is allowed to cool to room temperature and the solid material filtered. This procedure is repeated until the M.P. of the salt is constant at 177.7–178.2° C. The $[\alpha]_D$ of the salt is $-55.5° +-0.5°$. The acid is then recovered by extracting the salt between petroleum ether and 10% hydrochloric acid. Concentration of the petroleum ether layer gives an oil which gradually crystallizes. The acid thus obtained has a $[\alpha]_D^{23.5}$ of $+36.5°$, M.P. 61.5–62.0° C.

We claim:

1. A racemic compound of the formula

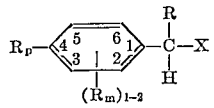

in which R is a lower alkyl radical or when taken together with hydrogen methylene or ethylidene, $R_p$ is cyclohexyl, $R_m$ is halogen, lower alkoxy, trifluoromethyl, lower alkylthio, mercapto, amino, di(lower alkyl)amino, cyano, nitro, carboxamido, lower alkanoylamino, lower alkylsulfonyl, di(lower alkyl)sulfamyl or hydroxy; but with the proviso that there is not more than one trihalomethyl substituent in the benzene ring and that any such substituent is in the 3-position and X is $CONH_2$ or a substituted carbamoyl group of formula CONHY or CONYY', wherein Y and Y' are lower alkyl, hydroxy lower alkyl, poly hydroxy lower alkyl, phenyl lower alkyl, phenyl, lower alkoxy phenyl, halogenophenyl, trifluoromethylphenyl, cyclohexyl, and N-dilower alkylamino lower alkyl.

2. The (d) form of a compound as claimed in claim 1 substantially free of the (1) form.

References Cited

UNITED STATES PATENTS

| | | | |
|---|---|---|---|
| 3,422,140 | 1/1969 | Corrodi et al. | 260—559 |
| 3,385,886 | 5/1968 | Nicholson et al. | 260—558 |
| 3,301,655 | 1/1967 | Wann et al. | 260—558 |
| 3,147,275 | 9/1964 | Fruhstorfer et al. | 260—559 |
| 2,579,295 | 1949 | Behrens et al. | 260—559 |

OTHER REFERENCES

Baskokov et al.: S. Gen. Chem. of USSR, vol. 23, pp. 905–07 (1953).

Wilds et al.: J. Org. Chem., vol. 13, pp. 763–79 (1948).

Fuson et al.: J. Org. Chem., vol. 9, pp. 187–192 (1944).

HENRY R. JILES, Primary Examiner

H. I. MOATZ, Assistant Examiner

U.S. Cl. X.R.

260—558, 559, 556, 141, 650, 544, 580, 519, 247.7, 294.7, 326.85